(12) United States Patent
Chung et al.

(10) Patent No.: US 8,214,913 B2
(45) Date of Patent: Jul. 3, 2012

(54) PHYSICALLY SECURE COMPUTING SYSTEM AND DEVICE, AND PHYSICALLY SECURE CONTAINER THEREFOR

(75) Inventors: Kevin Kwong-Tai Chung, Princeton, NJ (US); Victor Jun Dong, Edison, NJ (US)

(73) Assignee: Panasec Corporation, Princeton Junction, NJ (US)

( * ) Notice: Subject to any disclaimer, the term of this patent is extended or adjusted under 35 U.S.C. 154(b) by 641 days.

(21) Appl. No.: 12/423,294

(22) Filed: Apr. 14, 2009

(65) Prior Publication Data
US 2010/0115634 A1 May 6, 2010

Related U.S. Application Data

(60) Provisional application No. 61/198,085, filed on Nov. 3, 2008, provisional application No. 61/200,302, filed on Nov. 26, 2008.

(51) Int. Cl.
*G06F 1/26* (2006.01)
(52) U.S. Cl. ............................................. 726/34; 726/35
(58) Field of Classification Search .................... 726/34, 726/35; 361/679.55, 679.41
See application file for complete search history.

(56) References Cited

U.S. PATENT DOCUMENTS

| | | | | |
|---|---|---|---|---|
| 5,644,338 A * | 7/1997 | Bowen | ........................... | 345/168 |
| 6,182,481 B1 * | 2/2001 | Nagy | ............................... | 70/58 |
| 6,490,154 B2 * | 12/2002 | Thompson | ............... | 361/679.41 |
| 7,036,730 B2 | 5/2006 | Chung | | |
| 7,315,443 B2 * | 1/2008 | Allen | ....................... | 361/679.55 |
| 7,319,397 B2 | 1/2008 | Chung | | |
| 7,342,497 B2 | 3/2008 | Chung | | |
| 7,422,150 B2 | 9/2008 | Chung | | |
| 7,423,535 B2 | 9/2008 | Chung | | |

(Continued)

OTHER PUBLICATIONS

K.L. Security Enterprises, Inc., "GSA Approved IPS COMSEC Container + ioSafe disaster proof hardware—Fire Resistant Hard Disk Drive Backup", printed Apr. 7, 2009, 4 pages, www.klsecurity.com/gsa_advantage/iosafe-ips-container-fireproof-security.

(Continued)

*Primary Examiner* — Samson Lemma
(74) *Attorney, Agent, or Firm* — Clement A. Bernard, Esq.; Dann, Dorfman, Herrell & Skillman, PC

(57) ABSTRACT

A secured computing system and container therefor may comprise: a base for receiving a computing device; a securable first cover for substantially enclosing at least part of the computing device when the first cover is in a first position in the base; a securable second cover for preventing access to the computing device when the second cover is in a secured position, wherein access to the computing device is available when the second cover is not in the secured position. The computing device may be substantially enclosed when the first cover is in the first position in the base and the second cover is in the secured position; and one or more user features of the computing device may be accessible when the first cover is not in the first position in the base. The computing device may include a computer processor or computer peripheral.

40 Claims, 10 Drawing Sheets

U.S. PATENT DOCUMENTS

| | | | |
|---|---|---|---|
| 7,431,209 B2 | 10/2008 | Chung | |
| 7,461,787 B2 | 12/2008 | Chung | |
| 7,471,508 B2* | 12/2008 | Martin-Otto | 361/679.55 |
| 2001/0000447 A1* | 4/2001 | Thompson | 361/686 |
| 2004/0177658 A1* | 9/2004 | Mitchell | 70/58 |
| 2006/0176661 A1* | 8/2006 | Allen | 361/683 |
| 2007/0290115 A1* | 12/2007 | Meyer | 248/346.06 |

OTHER PUBLICATIONS

Trusted Systems, Inc., "INCOGNITO Executive IPS Security Container", 3 pages, date prior to Apr. 14, 2009.

Computer Security Products, Inc., "Enclosures—Full Metal Jackets and Laptop Security/Laptop Theft—Laptop Locker", printed Apr. 7, 2009, 5 pages, www.computersecurity.com.

* cited by examiner

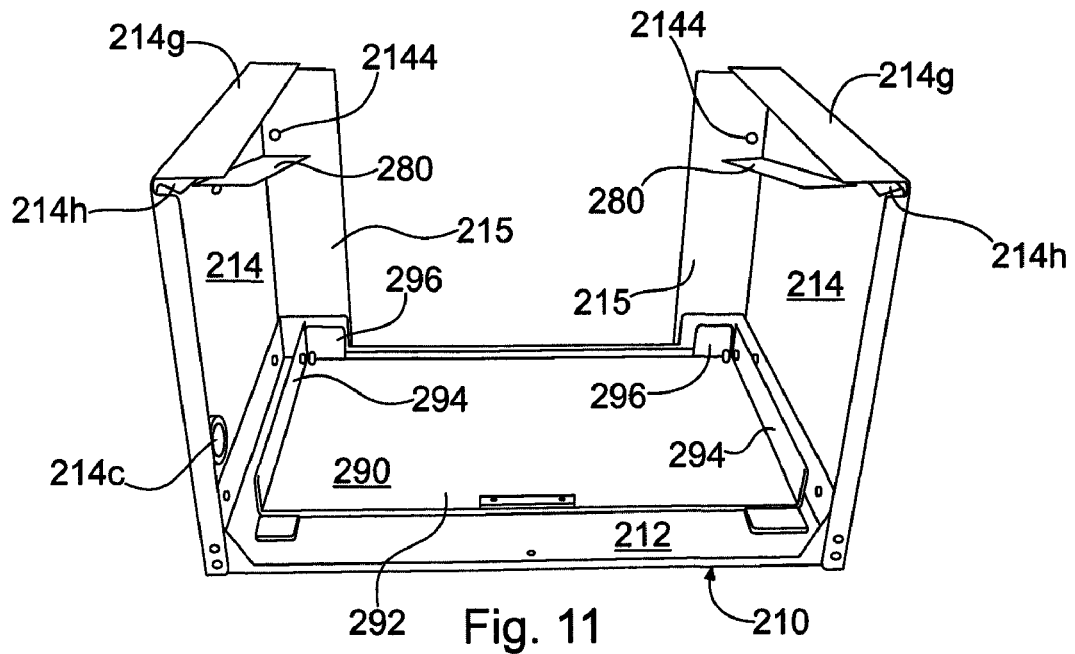
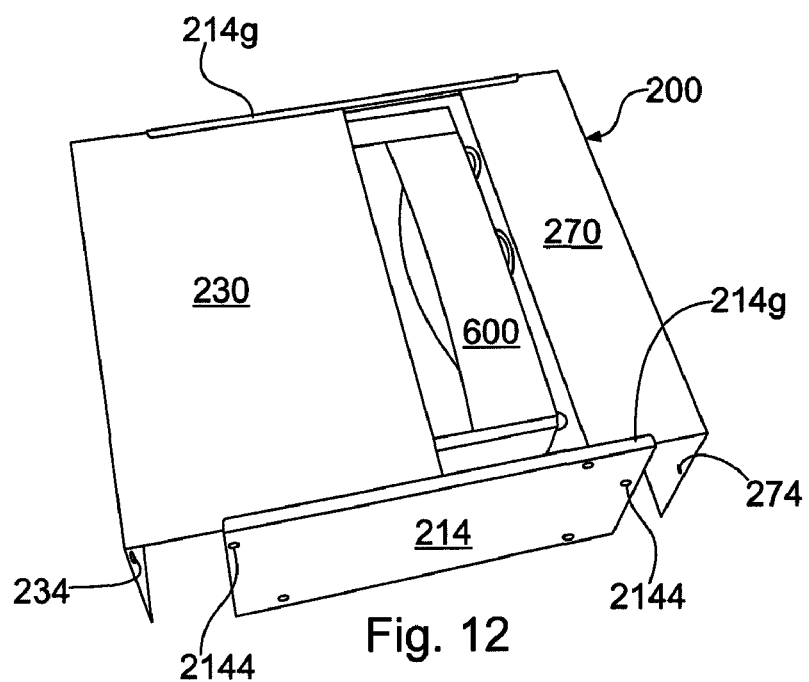

PHYSICALLY SECURE COMPUTING SYSTEM AND DEVICE, AND PHYSICALLY SECURE CONTAINER THEREFOR

This Application claims the benefit of U.S. Provisional Application No. 61/198,085 filed Nov. 3, 2008, and of U.S. Provisional Application No. 61/200,302 filed Nov. 26, 2008, each of which is hereby incorporated herein by reference in its entirety.

The present invention relates to a secure computing system and device and to a security container therefor.

The need for computer security is recognized and is typically provided by various forms of protection implemented by physical protection, software protection, or both. In the usual work or home situation, the processor, input device and monitor that comprise a computer are typically left in the place at which they are used with physical security being provided by their location, e.g., in a locked desk, cabinet, room, building, or the like, with alternative and/or additional protection being provided by computer software that limits who may use the computer, e.g., by requiring a user ID and password, a key (mechanical and/or electronic), a biometric identifier, or other access control arrangement.

While the foregoing arrangements usually are sufficient, different arrangements are often needed when a computer or other computing device is employed for a specific function. In many if not most specific dedicated uses, the bare functional parts of the computer and/or computing device are typically packaged inside a dedicated structure that is configured for use for a dedicated purpose, and they are not packaged as they might be for a personal computer, a portable/laptop computer and the like.

For example, for a computer operated kiosk or station, such as might be provided for airline and train check-in, for a self-check out at a store or library, or for an ordering station at a store, the kiosk structure typically provides structural support and physical security for the parts of the computer and its peripheral devices while the display screen of the monitor and the keyboard input device may be placed at openings in the kiosk structure so as to be accessible to kiosk users. Typically, these computer parts are not separately packaged, but are simply unpackaged functional devices as provided by a manufacturer or supplier of such part that are installed into suitably configured mounting structures that are provided as part of the kiosk structure. Peripheral devices, such as printers and scanners, may also be included therein with suitable mounting structures. As a result, these kiosk structures are relatively complex and specialized, and so are a significant component of the cost of such kiosk or station.

In other examples, the computer parts may be packaged into highly customized containers suitable for the intended specialized use. A computerized voting machine is one example of such specialized use wherein computer parts are typically installed in a specially designed voting machine container that provides a display monitor for viewing by a voter, and an input device such as a touch screen overlying the display monitor for entry of voting information, and optionally a keyboard or other alternative input device, and optionally an output device, such as a printer. Voting machine containers also provide physical security for the components of the voting machine including the computer parts employed to implement the voting functions, and typically are custom designed and manufactured. As a result, these containers add significant complexity and expense to the voting machine.

In addition, computing devices other than and/or in addition to a computer itself may need to be provided for in a given example application. In a point of sale application, for example, the computing device may include, in addition to a computer per se, a scanner, e.g. for scanning a credit card or other identification or payment medium, and a printer, e.g., for printing an invoice or receipt. For a custom container to be provided to also include these devices would cause additional complexity and expense.

Accordingly, there is a need for a physically secure computing system that is less costly and less complex than is a computing system that employs a specialized or customized security enclosure. Similarly, there is a need for a physically secure computing system container that is less costly and less complex than is a specialized or customized security enclosure.

The present secured computing system and container therefor may comprise: a base for receiving a computing device; a securable first cover for substantially enclosing at least part of the computing device when the first cover is in a first position in the base; and a securable second cover for preventing access to the computing device when the second cover is in a secured position, wherein access to the computing device is available when the second cover is not in the secured position. The computing device may be substantially enclosed when the first cover is in the first position in the base and the second cover is in the secured position; and one or more user features of the computing device may be accessible when the first cover is not in the first position in the base.

BRIEF DESCRIPTION OF THE DRAWING

The detailed description of the preferred embodiment(s) will be more easily and better understood when read in conjunction with the FIGURES of the Drawing which include:

FIG. 11 is a rear view of the second example embodiment of a secured computing device security container of FIGS. 9 and 10 shown in an open condition with the computer printer or scanner removed;

FIG. 12 is a top and side view of a third example embodiment of a secured computing device security container for a computing device such as a computer printer or scanner, shown in a partially closed condition;

Figure 1A:
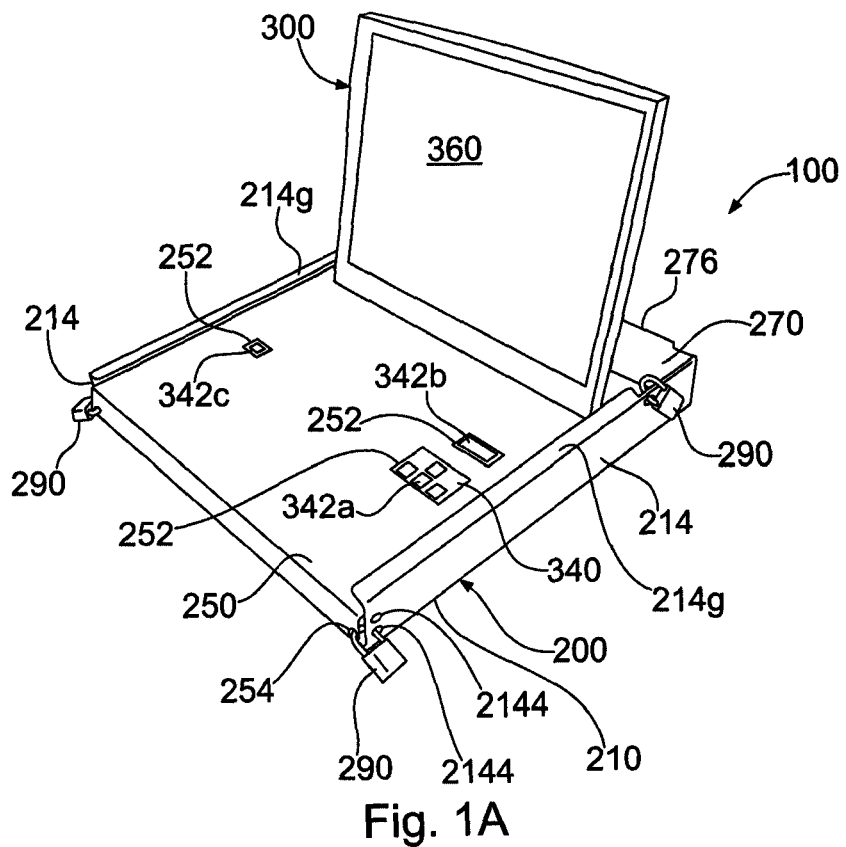
FIG. 1 includes FIGS. 1A, 1B and 1C which are views looking towards the top, front and side, towards the top and front, and towards the side and top, respectively, of an example embodiment of a secured computing device including a security container when the security container is arranged to allow use of the computer.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED
EMBODIMENT(S)

In general, a computer is one type of computing device and generally comprises a processor, an input device such as a keyboard, and a monitor, such as a display. In a portable computer, laptop computer, notebook computer, personal digital assistant, and the like, the processor and input device are typically packed in a base and the monitor is attached to the base, typically by a hinged or swivel connection so that the monitor may be placed against the base for travel and storage and may be erected to a use position. In a desk top computer, personal computer, or workstation, the input device and monitor are typically separately packaged for being placed at convenient positions on a desk, counter or other work station, and the processor is packaged separately in a "tower" or other unit that may be positioned on, in or under a desk or other work station, as may be convenient. Other computing devices, e.g., a printer, a scanner, and/or a router, may also be desired.

The secure computing system of the present arrangement, and the container employed therewith, provides for layered protection and for multiple layers of security for a computing device. The computer per se or computer peripheral device per se, has little physical security itself, because it is intended to be convenient to use and to be accessible to a user and to repair personnel. In the present arrangement, the computing device is placed inside a container base and is covered by a first removable cover that limits access to the computing device controls, e.g., the keyboard in most cases, but not its output device, e.g., display or monitor, whereby it may be utilized for purposes requiring a certain level of security with reduced possibility of a user being able to access the computer in a way that could change its function or that could be hacking, or that could simply be a well-intentioned attempt to refill a supply, clear a jam, or provide other normal user service.

The first removable cover provides a user access protection layer which limits the keys or other controls to which a user has access, and those keys may be limited to a relatively small number, e.g., four to six keys, typically alpha-numeric keys, not function keys. Under a typical security protocol, this cover would likely be removable by a limited number of personnel, typically a small number of trusted personnel at a relatively high level of security, who are authorized to access the computer for programming and controlling its function.

A second removable cover or member is provided to enclose the input and output ports and other connections to the computer, thereby to limit the ability to connect the computer to external devices though which data and/or programs may be loaded into the computer, downloaded from the computer, or changed in the computer, whereby the computer may be utilized for purposes requiring a certain level of security with reduced possibility of a user being able to access the computer in a way that could change its function or that could be hacking. The second removable cover or member provides a configuration access protection layer which limits the input and output ports and/or connections which a person has access. Ones of such input/output ports and connections may be available to a user, e.g., the power cord connector, however, all other input/output ports and connections would be blocked, e.g., USB ports, network ports, CD and/or DVD drives, PCMCIA slots, and the like. Under a typical security protocol, this cover or member would likely be removable by a limited number of personnel, typically a small number of trusted personnel at a relatively high level of security, who are authorized to access the computer for programming and controlling its function.

A third removable cover may be provided to enclose the entire computer, thereby to limit all access to the computer, as is appropriate when the computer is being shipped, transported or stored. The third removable cover provides a shipping and storage protection layer which limits access to all parts of the computer. Under a typical security protocol, this cover would likely be removable by a limited number of personnel, typically a larger number of trusted personnel at a relatively lower level of security, but not trusted to the level of those at the relatively high level of security referred to in the preceding two paragraphs, who are authorized to access the computer to set the computer up for use.

It is noted that in a particular instance wherein the first and third covers are of about the same size and shape, and where the level of security desired with regard to the protection provided by those covers is the same, one physical cover may be provided to serve the functions of both the first and third covers. In such instance, the one physical cover would be placed at different times into the different positions into which the first and third covers are normally placed, and appropriately secured therein.

As a result, substantial physical security may be provided by the present arrangement so that a relatively inexpensive commercial off-the-shelf (COTS) computer, and/or a relatively inexpensive commercial off-the-shelf (COTS) peripheral device, may be utilized for a function that requires such physical security or that requires at least that tampering or another breach of security is detectable. Examples of such functions include, but are not limited to, government elections, private elections, other computer voting, computer surveys, data entry terminals, inquiry terminals, educational testing, gaming terminals, point of sale (POS) terminals, and the like.

Figure 1B:
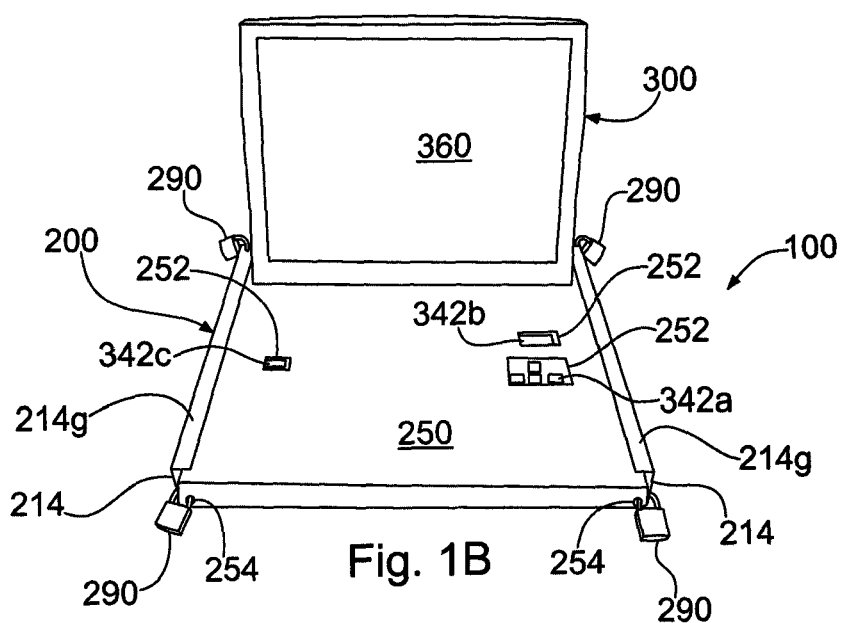
Figure 1C:
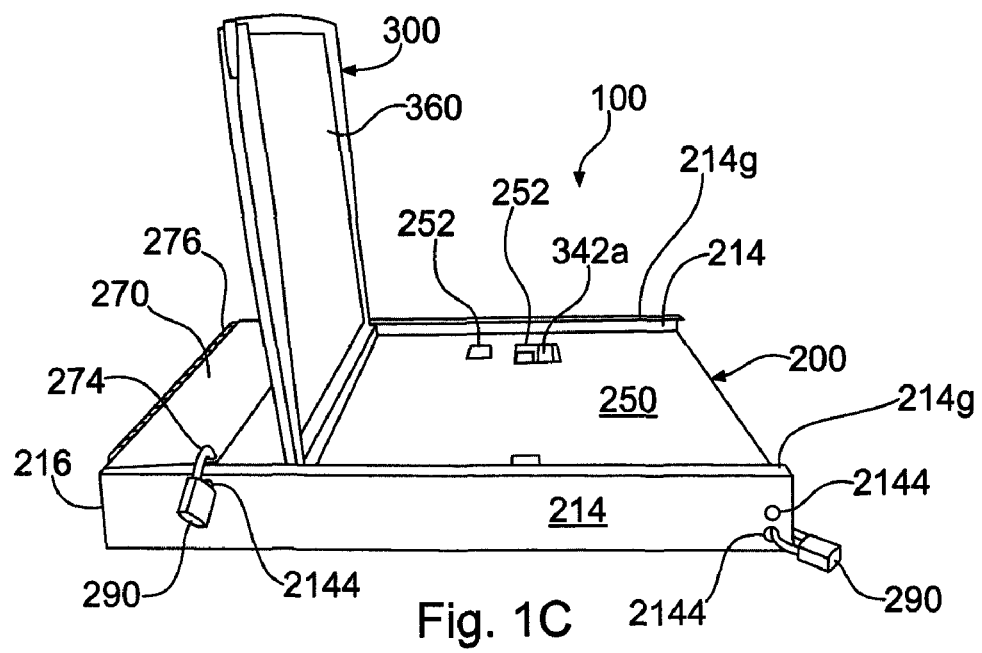

FIG. 1 includes FIGS. 1A, 1B and 1C which are views looking towards the top and front corner, towards the top and front, and towards the side and top, respectively, of an example embodiment of a secured computing device 100 including a security container 200 therefor when the security container 200 is arranged to allow use of the computing device secured therein, such as a computer 300. The computer 300 in this example is a portable or laptop computer 300 having a processor 320, a input device such as keyboard 340 and an output device such as display or monitor 360.

Security container 200 for computer 300 comprises a base 210 for receiving at least computer processor 320, a computer input device 340 and a computer monitor 360 therein, a removable and securable first or outermost cover 230 cooperating with base 210 for substantially enclosing at least computer processor 320, computer input device 340 and computer monitor 360 therebetween, a securable second or inner cover 250 cooperating with base 210 for substantially enclosing computer input device 240, second cover or member 250 having at least one opening 252 through which at least one actuator 342 of the computer input device 340 is accessible, and a securable third cover 270 cooperating with base 210 for providing access to predetermined ones of input and output ports and/or devices of the computer processor 320. While openings 252 may simply be holes made in a sheet metal cover or member 250, openings 252 may have flanged edges that are formed to extend a distance from the edge of the opening so as to extend closer to actuators (keys) 342, thereby to make actuation of actuators 342 that are near to opening 252, but that are not intended to be accessible through opening 252 to be better protected against actuation. Actuators 342 may comprise, e.g., different keys 342a, 342b, 342c of a keyboard 340 of computer 300 wherein computer 300 is programmed to assign particular functions thereto.

Each of covers 230, 250, 270 may be secured to base 210 by one or more security devices 290 when in a desired position for providing security for computer 300. Security devices 290 may include, e.g., locks 290, security tags, plastic ties, and the like, as may be appropriate for the degree of security desired. To this end, walls 214 of base 210 and covers 230, 250, 270 have respective openings or holes 2144, 234, 254, 274 therein through which security devices 290 may be placed.

Container base 210 has, e.g., a generally planar bottom 212 (not visible) and three adjacent walls including side walls 214 and rear wall 216 extending from base 212 for defining a cavity or volume into which computing device 300 may be placed. Thus, container 200 is typically slightly wider than is, e.g., computer 300, is typically slightly deeper than the depth of computer 300 when display 360 is folded against processor 320, and is typically longer than computer 300 so as to provide a cavity between processor 320 and rear wall 216. Preferably, the cavity between processor 320 and rear wall 216 has sufficient room to allow connection of wires and cables to input and output connections, e.g., AC and/or DC power, serial and parallel ports, USB ports, and the like, of processor 320, and may have sufficient room for storing of wires and cables. Container base 210 may also have an optional front wall 218 extending upward from its bottom 212, e.g., for limiting the forward movement of computer 300 within base 210.

Container walls 214 may have, e.g., flanges, projections, grooves or other features that define guides, grooves, slots or the like into which covers 230, 250 may slide or fit to be held in a securing position. To this end, the upper edge of wall 214 may be bent inward as shown to provide one side of a guide for cover 230, and one or more flanges may be provided parallel to the bent edge 214g to define one guide in each wall 214 for cover 250. In one example embodiment in particular, the bent edge of wall 214 and the rear surface of display 360 of computer 300 provide sufficient restraint for cover 230, and one flange and the keyboard 340 of computer 300 provide sufficient restraint for cover 250. In practice, the same cover 250 may also be utilized as cover 230 because the rear surface of display 360 blocks the openings 252 thereof.

Cover 270 is secured to base 210 so as to cover the space between the rear of processor 320 of computer 300 and rear wall 216 of container 200, e.g., by security devices 290 passing through respective holes 2164 (not visible) and 274. While cover 270 is shown as being hinged 276 along its edge adjacent to the edge of rear wall 216, which is one preferred arrangement, it may be secured in place by one or more additional security devices 290 in place of the hinge 276. Wall 216 may be eliminated and hinge 276 may be located along the rear edge of bottom 212 of base 210 with cover 270 extending to provide the covering otherwise provided by eliminated wall 216. Cover 270 and/or wall 216, or both, may have one or more cut-outs or slots through which wires and cables may pass, e.g., a power cable extending to an electrical outlet (e.g., an 110 V AC wall outlet) or other source of electrical power, e.g., a slot near the forward edge 272 of cover 270.

It is noted that the described security container 200 need not be of sophisticated design or manufacture, and need not be aesthetically attractive or fancy, since one desire is to enable a relatively inexpensive computer, e.g., a laptop computer costing only $300-600, to be used simply and inexpensively in a particular application while providing a certain level of security. Thus, it would be desirable to avoid the expense and complexity of custom designed and manufactured enclosures and the like, however, security container 200 may be made in a way and using materials and processes that result in other than a basic, inexpensive, security container.

Figure 2:
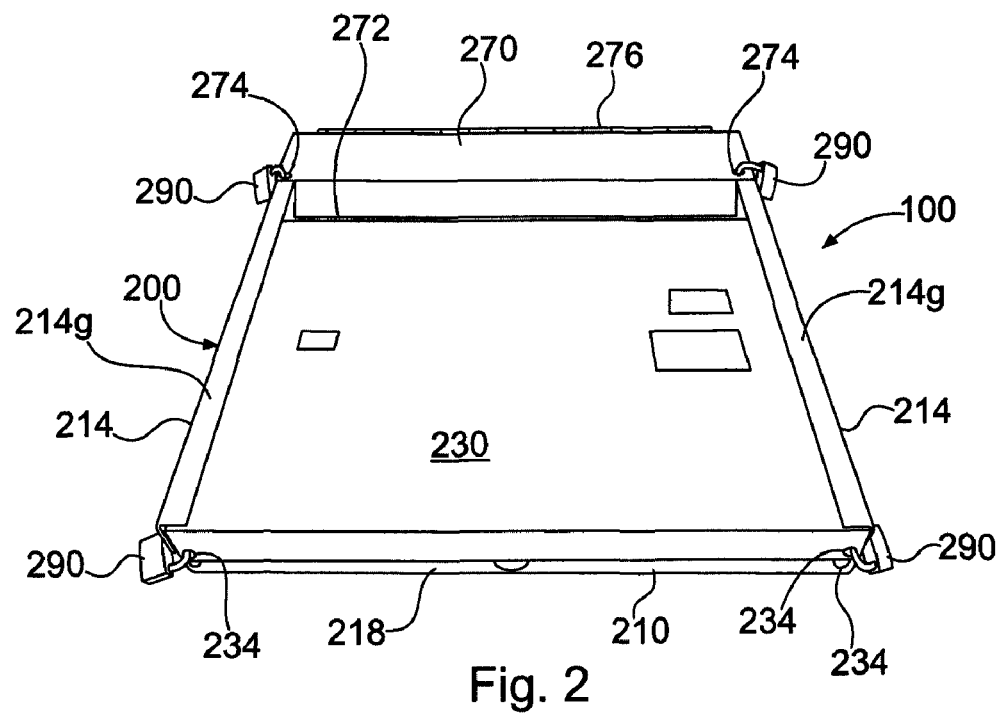
FIG. 2 is a view looking towards the front of the example embodiment of the secured computing device of FIG. 1 when the security container thereof is arranged for travel or storage.

FIG. 2 is a view looking towards the front of the example embodiment of a secured computing device 100 including a security container 200 for a computing device 300 of FIG. 1 when the security container 200 thereof is arranged for travel or storage. To that end, cover 230 is placed between the bent edge of wall 214 and the rear surface of display 360 of computer 300 which has been folded to be adjacent the processor/keyboard 320, 340 thereof, thereby rendering the keyboard 340 inaccessible, In this secured condition, computer 300 can not be operated because keyboard 340 is inaccessible and display 360 can not be viewed. Thus, this condition is suitable for storage, for travel, for shipment, or for any other non-use function. It is noted that many laptop computers automatically go into a standby state to conserve power when the display is folded adjacent the keyboard, and thereafter to turn off or to hibernate, and so this secured condition will usually result in computer 300 hibernating and/or turning itself off.

Figure 3:
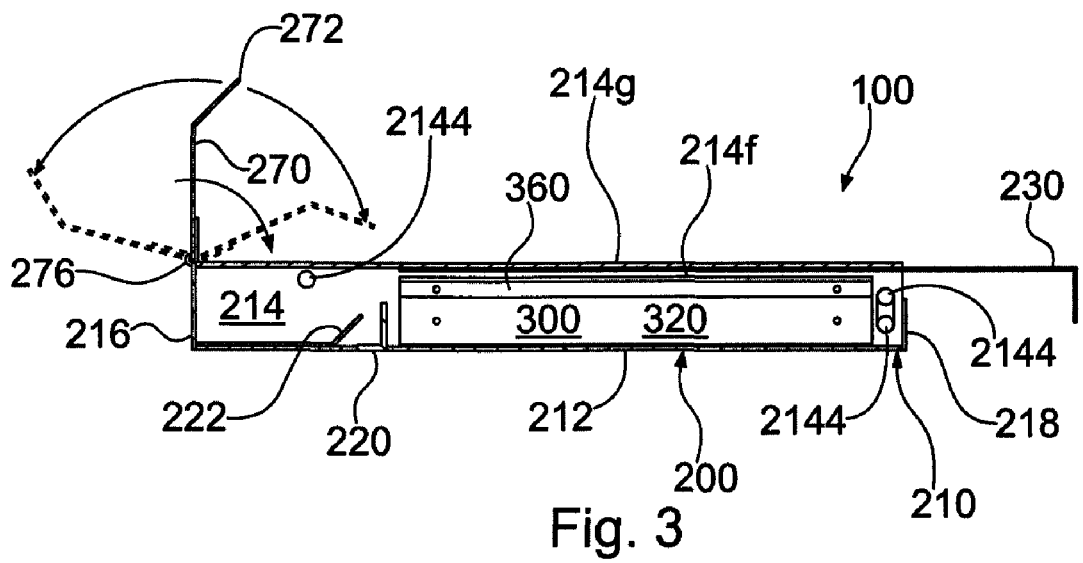
FIG. 3 is a side cross-sectional view of the example embodiment of the secured computing device and security container of FIGS. 1 and 2.

FIG. 3 is a side cross-sectional view of the example embodiment of a secured computing device 100 including security container 200 for a computing device, e.g., computer 300, of FIGS. 1 and 2. Container base 210 is seen with bottom 212, rear wall 216 and optional front wall 218 sectioned, and with a computer 300 disposed in base 210. Processor 320 of computer 300 is shown resting on bottom 212 and display 360 is shown folded adjacent processor 320 thereof. In practice, spacer blocks, preferably of a cushioning material, e.g., of urethane, foam, or other resilient material, may be placed between the sides of processor 320 and walls 214, 216, 218 of base 210 so that processor 320 is held in a relatively fixed location therein. Similarly, cushioning material may be placed between cover 250 and display 360, between display 360 and cover 230, and wherever else such cushioning may be placed. Cover 230 is shown in a position through which it would pass when being inserted into base 210 of container 200 or when being removed therefrom.

Container 200 may include certain optional features that complement the operation of computer 300 within container 200. For example, an angle 220 may be attached to bottom 212 of base 210 to provide support at the rear of processor 320 or to provide additional heat dissipating surface area, or both, and angle 220 may have slots, holes or other openings therein for passing wires and cables that may be attached at input/output ports or other connections at the rear of processor 320. Angle 220 may be permanently fastened to base 212 or may be removably fastened thereto, e.g., by fasteners that are removable only when cover 270 is open.

In one preferred arrangement, angle 220 cooperates with cover 270 to block access to predetermined input/output ports and connections located along the rear of processor 320 thereby to protect against access to such inputs/outputs except by persons permitted to open cover 270 so as to access such ports and connections. In such arrangement, one or both of angle 220 and cover 270 may have slots in predetermined related locations so as to permit access to certain ports and/or connections, e.g., a socket for receiving an electrical power cord, or an output port for connecting a printer, while blocking access to other ports and connections, e.g., USB ports.

It is noted that while one cover 270 is shown (in solid lines), plural covers 270 (shown in solid and dashed lines) may be provided so as to provide different degrees of access to different ones of the ports and connections at the rear of processor 320. In such embodiment, an inner cover 270 would when closed protect predetermined ports and connections of processor 320 while an outer cover 270 when opened would allow controlled access to those ports and connections to which access is permitted by inner cover 270 when closed. Wires and cables, such as power cords and peripheral cables, could be stored between inner and outer covers 270 which would be differently shaped to define a cavity therebetween for such storage. Such wires and cables may be able to be plugged in and unplugged only when inner cover 270 is open, and so may be captive and stored in container 200, or they may be able to be plugged in and unplugged while cover 270 is closed.

Base 210 may have holes or other openings therein for enhancing its housing of computer 300. For example, angled tab 222 results from bending up a portion of bottom 212 defined by a U-shaped or C-shaped cut therein, thereby to provide an opening in bottom 212, e.g., for enhancing air flow for cooling processor 230. In addition, a circular opening or a circular pattern of arcuate openings may be provided in bottom 212 at a location corresponding to a similar opening in the bottom of processor 230, e.g., through which a cooling fan of computer 300 moves air for cooling. Preferably, none of the holes and openings in base 210 allow access to any input, output, connection, input device or other part of computer 300 that might allow entry or removal of data or changing of the programming of computer 300.

Cover 270 is illustrated as being rotatable about hinge 276 which is at the edge of rear wall 216 in an open position (solid line) and in more and less open positions (dashed lines). Cover 270 would be further rotated clockwise to a closed position in which edge 272 thereof is proximate angle 220 and tab 222, and in which position a security device 290 may be placed through holes 2144 and 274 for securing cover 270 in the closed position.

Cover 230 is illustrated as partially in position for closing container 200, i.e. by being slid to the left with its edges between bent over edges 214g of walls 214 and the rear of display 360 of computer 300. Thus cover 230 may be slid (leftward in FIG. 3) into a closed position and slid (rightward in FIG. 3) out of that closed position, when display 360 is folded adjacent to processor 320 of computer 300. When cover 230 is slid to the closed position, a security device may be placed through one of the holes 2144 in side wall 214 proximate wall 218, usually the upper hole 2144, and hole 234 of cover 230.

Cover 250 would likewise be slid into and out of position in base 210 with the edges of cover 250 disposed between the top of processor 320 and flange 214f when cover 230 is removed and display 360 is unfolded away from processor 320, e.g., into an operating position. Since cover 250 is the same size and shape as cover 230, and since covers 230, 250 need not be disposed in base 210 at the same time, the same physical cover can be used for both covers, as is a preferred embodiment. When cover 250 is slid to the closed position, a security device 290 may be placed through one of the holes 2144 in side wall 214 proximate wall 218, usually the lower hole 2144, and hole 254 of cover 250

Figure 4:
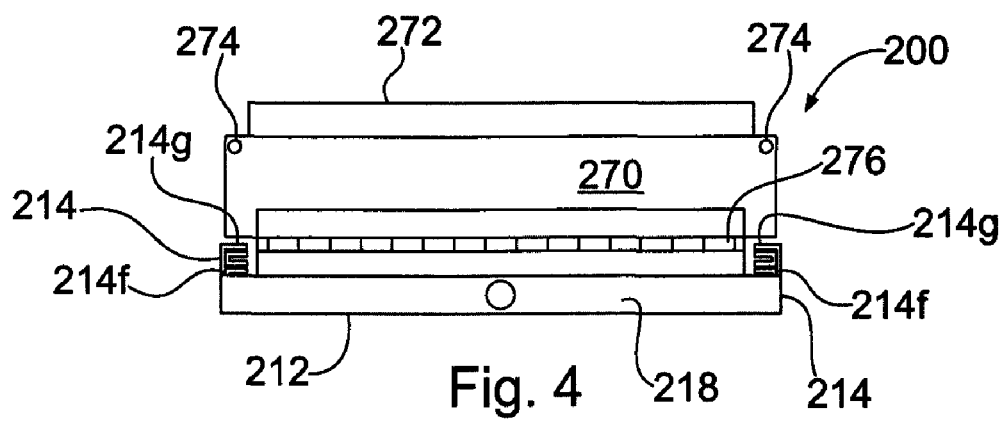
FIG. 4 is a front elevation view of the example base of the example embodiment of a secured computing device and security container of FIGS. 1 and 2.
Figure 4A:
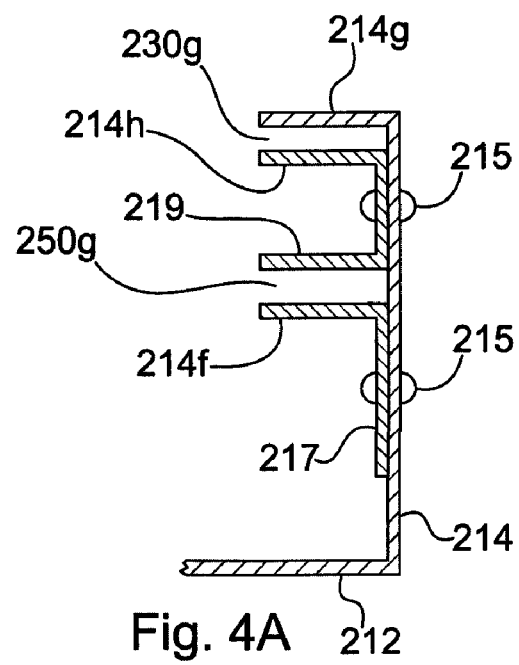
FIG. 4A is an enlarged view of a portion of FIG. 4.

FIG. 4 is a front elevation view of the example base 210 of the example embodiment of secured computing device 100 including security container 200 for a computing device, e.g., computer 300, of FIGS. 1 and 2, and FIG. 4A is an enlarged view of a portion of FIG. 4. Wall 218 extends upward from bottom 212 between side walls 214 of base 210 of container 200. Each of side walls 214 have flanges 214f, 214g extending inwardly for retaining covers 250 and 230 in place. Cover 270 is shown rotated upward on hinge 276 disposed on the top of rear wall 216, and holes 274 thereof are visible near notches adjacent edge 272.

Guides 250g and 230g for covers 250 and 230 may be provided in several different ways for retaining covers 250 and 230. As described above, flange 214g may be provided by bending the top edge of wall 214 inwardly and flange 214f may be provided by an angle 217 attached to wall 214 by fasteners 215, such as a rivet, screw, nut and bolt, a weld, a punch, and the like. With only flanges 214f and 214g, cover 230 when present is disposed between flange 214g and the rear of display 260 of computer 300 with display 360 folded against processor 320, and cover 250 when present is disposed between flange 214f and the keyboard 340 of computer 300 with display 360 erected.

Optionally, and generally preferably, a generally U-shaped channel 219 may be provided between flanges 214f and 214g, with channel 219 being attached at its base to wall 214 by fasteners 215. The sides of generally U-shaped channel 219 are disposed adjacent to and spaced apart from flanges 214f and 214g by a predetermined distance for defining the width of guides 230g and 250g. The width of guides 230g, 250g is slightly greater than the thickness of covers 230, 250 so that covers 230, 250 slide easily into and out of guides 230g, 250g.

Figure 5:
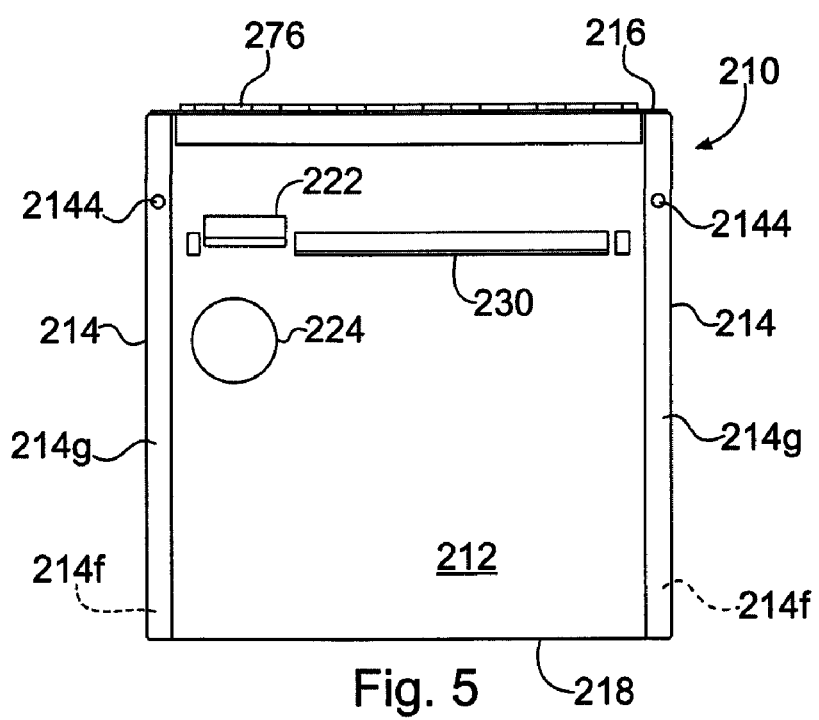
FIG. 5 is a plan view of the example base of the example embodiment of the secured computing device and security container of FIGS. 1 and 2.

FIG. 5 is a plan view of the example base 210 of the example embodiment of a security container 200 for a computing device of FIGS. 1 and 2. Further to the description above, bottom 212 of case 210 is seen to have angle 220 disposed transversely between opposing side walls 214 in a location that would be slightly behind the back of processor 340 of computer 300 when computer 300 is disposed in base 210. Angle 220 is attached to bottom 212 in similar manner to that used to attach angle 217. Approximately in line with angle 220 is raised tab 222 adjacent a generally rectangular opening in bottom 212 adjacent circular opening 224 which is located where it will be adjacent a cooling vent of processor 320 when computer 300 is in base 210.

Holes 2144 in flanges 214g of walls 214 proximate rear wall 216 are illustrated in locations where they are near to holes 270 of cover 270 when cover 270 is rotated so that edge 272 thereof is proximate bottom 212.

A circular opening 224, or a circular pattern of arcuate openings may be provided in bottom 212 at a location corresponding to a similar opening in the bottom of processor 320, e.g., through which a cooling fan moves air for cooling processor 320. None of the holes and openings in base 210 allow access to any input, output, connection, input device or other part of computer 300 that might allow entry or removal of data or changing of the programming of computer 300.

In one example embodiment, base 210, cover 230 and cover 270 of security container 200 was made entirely of sheet aluminum that was cut to pattern for the base and covers and each was then bent mainly at or near its edges to shape as illustrated. Angles 217, 219, 220 may also be of sheet aluminum. Thus, container 200 may be fabricated by employing relatively common and inexpensive materials and fabrication methods, but need not be so fabricated. Example container 200 was about 15 inches by about 15 inches by about 1¾ inches, which is suitable for containing a laptop computer that is about 12 inches by about 14 inches by about 1½ inches in size when the display is folded against the processor. Container 200 may be of any suitable material consistent with the level of security desired, e.g., may be steel, magnesium, titanium, laminated composite, nylon, engineered plastics, and the like, and may be of a combination of materials.

It is noted that the layered physical security protection system described herein need not provide a high level of physical security as might be provided by a more robust physical barrier, but is intended to provide a level of physical security that allows detection of tampering and other security compromises in an economical layered security container consistent with a low-cost applications of inexpensive computers, e.g., COTS computers, where security is important, but not paramount. Examples of such applications can include, but are not limited to computerized voting machines, direct recording electronic (DRE) voting machines, remote data terminals, point of sale (POS) terminals, customer inquiry terminals, data entry terminals, gaming terminals, and the like.

Various computer keys 342 may be utilized for different voting functions in accordance with the programming of computer 300 to perform various functions in various applications, as may be desired. Standard keyboards 340 may be utilized with keys rendered non-functional (blocked) by software control, or may remain operational, even though non-utilized keys are rendered non-accessible by cover 250 of container 200. Except where write-in selections are to be made using computer 300, access to the alphabetical character keys of keyboard 340 may be limited by cover 250 and/or by software programming. Preferably, "function" keys, such as the keys F1 through F12, CTRL, ALT, DEL, FN, and/or ENTER, are blocked by cover 250, and optionally are also rendered non-functional by software programming. In particular, key combinations such as CTRL-ALT-DEL may be disabled from initiating their usual functions. Software programming may also be used to change or otherwise modify the function of keys from their "traditional" function (which is usually marked on the keys) to a desired function, and the function or non-function may be different for individuals approved for different levels of security.

In a voting machine application, tampering could be attempted at any point in the preparation, transport, use, tabulation, and closing of a voting machine, e.g., by a voter, by a polling place worker, by a transportation worker, and by insiders such as election officials, politicians, voting machine providers, and the like, and may occur before, during and after an election. In such voting machine application, a COTS computer 300 may be programmed, loaded with election data, tested and verified by authorized election officials in a controlled location after which the COTS computer 300 is placed into security container 200 base 210 and cover 250 is put into place and secured (sealed) by locks, seals or other security devices 290 placed through the holes 2124 of base 212 and holes 254 of cover 250. Angle 220 of container base 212 may be placed and shaped to prevent access to certain input/output ports on the rear of processor 320 of computer 300 and/or cover 270 may be closed and secured by security devices 290 placed through holes 2144 of base 212 and holes 274 of cover 270. If only the authorized election officials are permitted to access the input/output ports of processor 320, then both sets of security devices 290 may be the same. If, however, officials at a polling place will be permitted to access some or all of such input and/or output ports, then security devices 290 securing cover 270 may be different from the security devices securing cover 250 so that local polling place officials may have access to the input/output ports, but not to the full keyboard and function keys which are protected by cover 250. An electrical power connection may be accessible through the closed cover 270 so that it is accessible by polling place officials without exposing the input/output ports of processor 320. Before programmed and tested computer 300 in container 200 is stored to await an election, during transport during an election, and before the polls open and after the polls close, cover 230 is put into place over folded display 360 and is secured by different security devices 290 through holes 2144 of container base 212 and holes 234 of cover 230 so that computer 300 is substantially completely enclosed and cannot be operated or tampered with. These last security devices 290 are of a type that polling place officials are able to and are permitted to remove and install in connection with opening and closing the polling place.

With regard to cover 250 which covers and protects keyboard 340, cover 250 may be secured with two security devices 290, e.g., two different security devices 290 having respective loops of different length that pass through holes 254, 2144. One security device 290 which remains in place and which polling place workers do not remove has a loop of relatively longer length that allows cover 250 to be moved, but not removed, so that the on/off switch of computer 300 is accessible, and possibly so that the row of function keys F1-F12 along the top of keyboard 340 is accessible, so that polling place workers can actuate such keys for turning on and initializing computer 300 when opening a polling place and to close and turn off computer 300 when closing the polling place. A second security device 290 which may be removed by polling place workers for opening and closing voting computer 300, but that is in place when voting is being conducted, has a relatively shorter loop that restricts cover 250 from being moved a distance that would provide access to any keys of keyboard 340 other than keys 342. Alternatively, base 212 and/or cover 250 may have a slot in place of one hole 254, 2144 and may employ two security devices 290 of similar loop length so as to permit the limited movement of cover 250 by polling place workers as described above while restricting both polling workers and voters from accessing keys of keyboard 340 other than those they are respectively authorized to access.

In such voting application, when computer 300 in container 200 is available for voting, cover 230 is removed to permit voting and covers 250 and 270 remain in place secured by security devices 290 so that voters only have access to keys 342 through openings 252 in cove 250. Predetermined keys 342 of keyboard 340 of computer 300 are accessible to voters and polling place workers, and are assigned particular voting functions by the voting software with which computer 300 is programmed for conducting voting. In the example shown in FIGS. 1A-1B, only keys 342a, 342b and 342c are available to voters through openings 252 of cover 250. Keys 342a may be assigned the function of allowing the voter to make a voting selection, e.g., to select a candidate or proposition to vote for.

In this arrangement, keys 342a of keyboard 340 may be two keys representing arrow up and arrow down movement of a cursor or of a highlighted indication of a selection where the possible voting selections are displayed in a column, or may be two keys representing arrow left and arrow right movement of a cursor or of a highlighted indication of a selection where the possible voting selections are displayed in a row, or may be four keys representing arrow up, arrow down, arrow left and arrow right movement of the cursor or highlighted indication where the possible voting selections are displayed in rows and columns. Key 342b may be a single key of keyboard 340 that is assigned the function of "Select" by which the voter votes for a selection, i.e. by which the voter indicates to the computer that the present position of the cursor or highlighted indication is the voting selection that the voter desires to make. Key 34C may be assigned the function of "Cast Ballot" by which the voter indicates that all of the voting selections that he desires to make have been made, and upon actuation of key 342c the voter's voting selections are recorded as votes by computer 300 and the present voting session is terminated.

For example, voting functions can be implemented with as few as four keys 342, wherein the up-arrow key (↑) may be programmed to move the cursor/pointer upward to the next candidate selection and the down arrow key (↓) may be programmed to move the cursor/pointer downward to the next candidate selection, wherein the ENTER key may be labeled "SELECT" and programmed to indicate to the computer 300 that the position of the pointer/cursor when the Select key is pressed indicates a selection by the voter, and wherein the CTRL key may be labeled "CAST BALLOT" and programmed to indicate to the computer that the voter has completed making selections and is casting a ballot of the selections made. Optionally, if the selections available are in more than one column, then the left arrow (←) key and the right arrow (→) key may be programmed to move the pointer/cursor leftward and rightward respectively, e.g., from column to column, to facilitate indicating selections. The conventional key functions may be completely changed by the programming (computer software) of computer 300 to perform whatever function the programmer may desire. Keys not being utilized for a function may be programmed to have no function, sometimes known as software logistic control, thereby increasing security, even thought they are covered by cover 250 in use.

Optionally, and additionally or alternatively, the ENTER key may be labeled "ZOOM IN" and the BACKSPACE key may be labeled "ZOOM OUT" and respectively programmed to allow part of the information displayed to be enlarged for easier reading and to allow the information displayed to be decreased in size so that a greater portion of the entire display may be viewed. Further, the up arrow (↑), down arrow (↓), left arrow (←), and right arrow (→) keys may be programmed to be utilized to respectively move (translate or scroll) the viewable portion of the display vertically and horizontally for viewing a desired portion thereof. Also, the CTRL key may be labeled "FINISH REVIEW" to allow the display to be blanked, e.g., so that the display cannot be viewed thereafter, e.g., at the completion of a voter voting, until the computer 300 is enabled for another voting session.

Examples of inter alia a computer implemented voting machine, of a computer implemented voting system, of voting displays, and of the operation thereof, that could be implemented in a COTS computer 300 that may be disposed in a container 200 are described in Applicant's U.S. Pat. No. 7,036,730 entitled "ELECTRONIC VOTING APPARATUS, SYSTEM AND METHOD," U.S. Pat. No. 7,422,150 entitled "ELECTRONIC VOTING APPARATUS, SYSTEM AND METHOD," U.S. Pat. No. 7,431,209 entitled "ELECTRONIC VOTING APPARATUS, SYSTEM AND METHOD," and U.S. Pat. No. 7,461,787 entitled "ELECTRONIC VOTING APPARATUS, SYSTEM AND METHOD," each of which is hereby incorporated herein by reference in its entirety.

Thus, it may be seen that security is enhanced by the present secured computing device including a security container which limits uncontrolled and/or unmonitored access to a computing device, e.g., a computer, particularly via USB, CD/DVD drives, other input/output points, and the like, through which programs and information may be loaded into, changed, and copied from, a computer. The proliferation of portable data storage devices, such as "thumb" drives, flash memories, external hard drives, tape drives, and the like, have made the removal and copying of data much easier. This feature can be particularly advantageous where the computer 300 in a physical security container 200 is a terminal or work station that has access, e.g., via the Internet, a network (internal and/or external), or other communication path, to a central computer, server, database, or other centralized data repository containing data that is to be protected against unauthorized access and copying.

Figure 6:
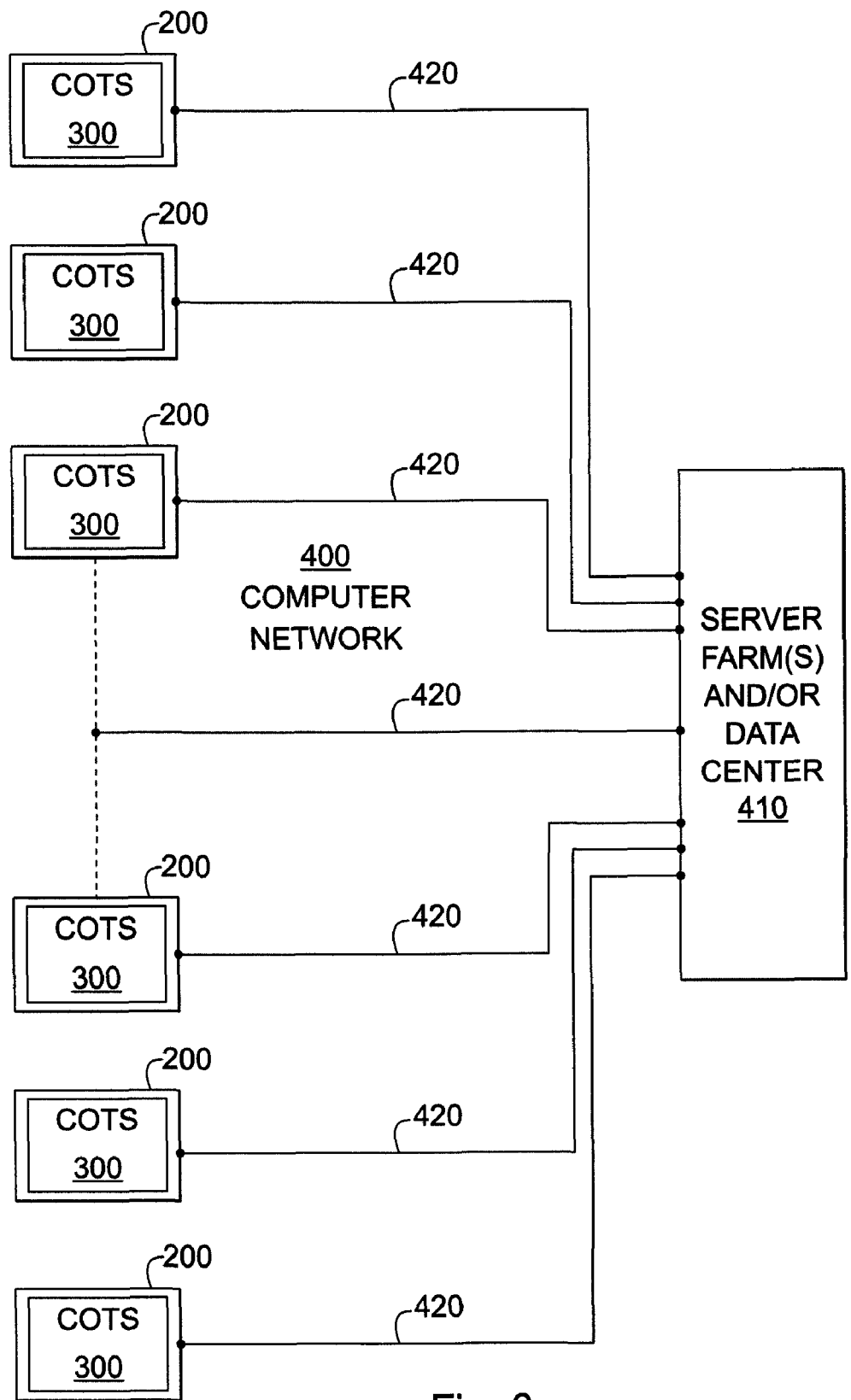
FIG. 6 is a schematic block diagram of an example computer network including a plurality of secured computing devices such as secured computing devices including computers that are in security containers as in FIGS. 1 and 2.

FIG. 6 is a schematic block diagram of an example computer network 400 including a plurality of secured computing devices including computing devices 100 each of which includes a respective security container 200 of the sort illustrated in FIGS. 1 and 2. Network 400 may comprise, e.g., a plurality of computers 300, each disposed in a physical security container 200, that are in communication via communication links 420 with a central computer 410, which may be one or more computers 410, or one or more processors 410, or one or more servers 410, one or more server farms 410, or one or more data centers 410, as may be convenient.

The need for physical security as may be provided by containers 200 tends to increase as work, even critical functions such as client data, accounting and data centers, is subcontracted and/or out-sourced, even internationally, so that more people in many different and additional locations and environments, gain access to terminals and work stations through which data may be entered and/or removed from a computer. The present security container allows access to be limited in such situations to a limited portion of a keyboard so that unauthorized access and access beyond authority may be reduced and/or detected.

Central computer 410 is typically protected by physical security of a facility, by screening, clearing, monitoring and controlling of personnel, by security software such as access control and firewall software and the like, by differentiated and limited access through passwords, keys and the like, as is known in the art. Communication links 420, which may include the Internet, a LAN, WAN, Ethernet, WiFi, ad hoc, or other network, wires, cables, fiber optics, and the like, as well as combinations thereof, are typically protected by physical security in the location, routing and construction of the elements thereof, as well as by encryption, monitoring devices and security software, as is known in the art.

Computers 300, in addition to the physical security and differentiated access provided by containers 200, may also be provided with security and firewall software, access controls, such as passwords, keys and the like, and any other security provisions as may be desired, and these protections may be provided with respect to all levels of access to computer 300 allowed by containers 200, e.g., to the user access permitted by cover 250 when external storage and shipping cover 230 is opened or removed, to the connection and configuration access permitted when cover 270 is opened or removed, and to the complete access possible when user access protection cover 250 is opened or removed.

Thus, computers 300, whether individually or as part of a network 400, may enjoy a degree of security against undetected physical access and/or undetected tampering provided by security container 200 in addition to the protections that may be provided by software and conventional network security.

Figure 7A:
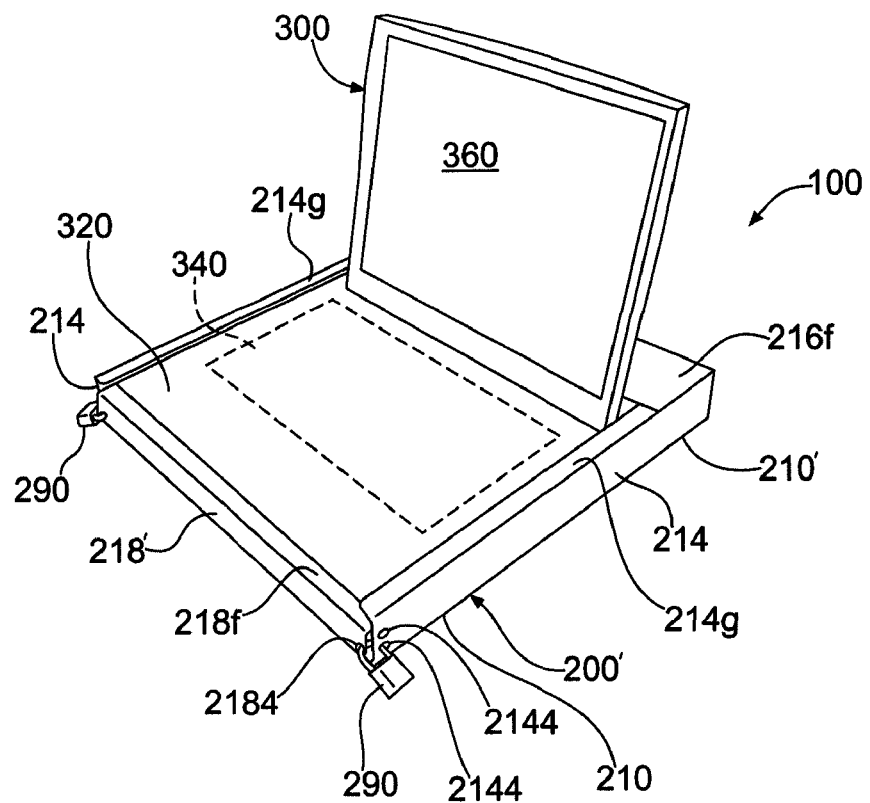
FIG. 7 includes FIG. 7A which is a view looking toward the front, side and top of an alternative example embodiment of a secured computing device similar to that of FIGS. 1 and 2, FIG. 7B which is a front and top view of the alternative example embodiment of the security container for a computer of FIG. 7A with a cover in place, and FIG. 7C which is a side cross-sectional view of the alternative example embodiment of a secured computer and security container for a computer of FIG. 7B.
Figure 7B:
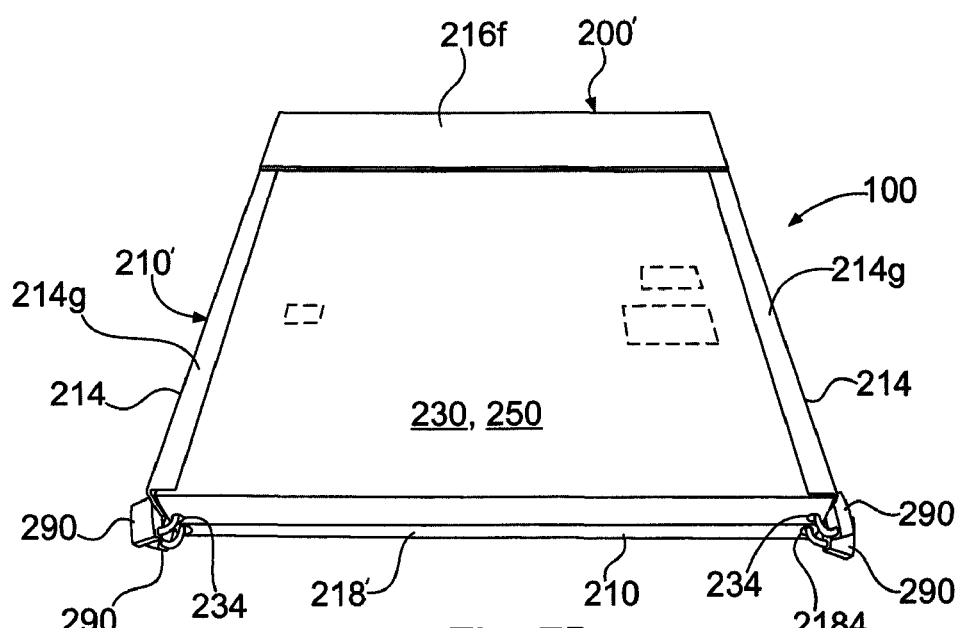
Figure 7C:
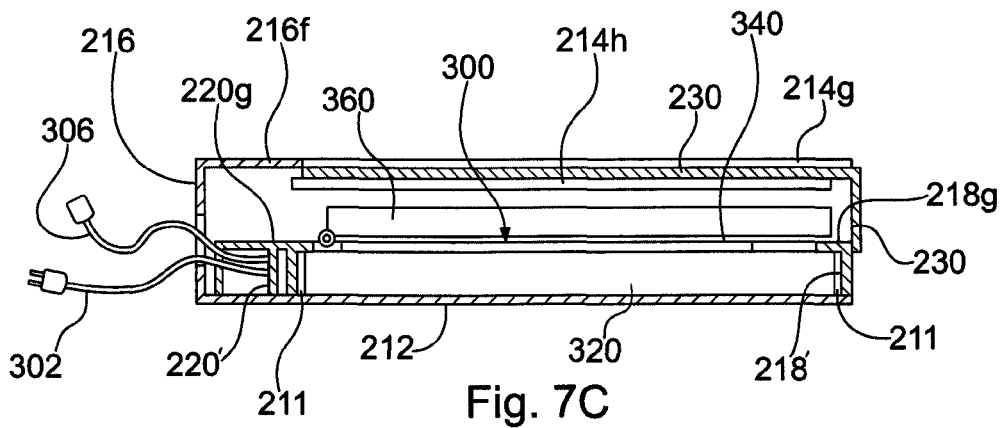

FIG. 7 includes FIG. 7A which is a view looking toward the front, side and top of an alternative example embodiment of a secured computing device 100 similar to that of FIGS. 1 and 2, FIG. 7B which is a front and top view of the alternative example embodiment of a security container 200' for a computer 300 of FIG. 7A with a cover 230, 250 in place, and FIG. 7C which is a side cross-sectional view of the alternative example embodiment of a secured computer 100 and security container 200' for a computer 300 of FIG. 7B. It is noted, e.g., that FIG. 7A illustrates secured computer 100 with security container 200' in a partially accessible configuration as might be desired for use or for initiating or terminating a use condition, and that FIG. 7B illustrates secured computer 100 with security container 200' in a closed configuration as might be desired for shipping, transport and/or storage.

In this arrangement, there need be no front wall 218 of base 210 and a front cover member 218' that is a removable and securable member 218' that is not integral to base 210' is provided. Cover member 218' preferably has an inwardly directed flange 218f that engages the top, forward portion of processor 320 of computer 300 when member 218' is secured to base 210'. Cover member 218' typically has holes 2184 near its ends that are proximate holes 2144 in side walls 214 of base 210' through which security devices 290 may be placed for securing removable cover 218' thereto and securing computer 320 in container base 210'.

Angle 220' may have a flange 220g that extends toward and engages the top, rear of processor 320 so that processor 320, and thus computer 300 of which it is a part, are held captive within base 210' of container 200' when member 218' is secured to base 210'. In this arrangement, there need not be a cover 270 at the rearward end of base 210 as described above because computing device 300 may be slipped into and removed from base 210' when member 218' is not secured to side walls 214 of base 210' by security devices 290, and the arrangement illustrated lacks a removable cover 270. Flange 216f extending from rear wall 216 and adjacent base 210' covers the space behind computer processor 320 where various cords and cables 302, 306 connect thereto.

Material 211, such as a cushioning material 211, may be provided at the front, rear, and/or sides, of computer 300, and/or underneath or above computer 300, so that computer 300 is held in a desired position within container 200' and does not move around therein when secured computer 100 is moved, e.g., either in use or in shipping or transport, or at another time. While material 211 may not be visible in other example embodiments, material 211 or an equivalent or substitute material may be provided in any embodiment. Material 211 may be, e.g., a urethane foam material, a Styrofoam material, a silicone material, a plastic, a rubber or rubber-like material, or any other suitable material.

Cords and cables 302, 306 and the various ports and connections, e.g., USB ports, CD and/or DVD drives and the like, usually located at the rear and sides of computer processor 320 are accessed by removing cover 218' and moving computer 300 forward with respect to container base 210' so that processor 320 comes clear of the space at the rear of container 200' that is defined by base bottom 212', side and rear walls 214, 216 and covering flange 216f. Covers 230 and 250 may be arranged and may operate as described above to provide one or two additional levels of physical security depending upon the levels of authorization granted to personnel. In other words, a single cover 230 may be provided or a single cover 250 may be provided, or a two covers 230, 250 may be provided, as may be appropriate given the number and levels of security desired in a particular situation. Any two covers, e.g., covers 218' and 230, covers 218' and 250, covers 230 and 250, covers 218' and 270, covers 230 and 270, or covers 250 and 270, provide two different levels of security if respective securing devices 290 having different access are employed, or at least providing an indication of tampering or access.

Figure 8:
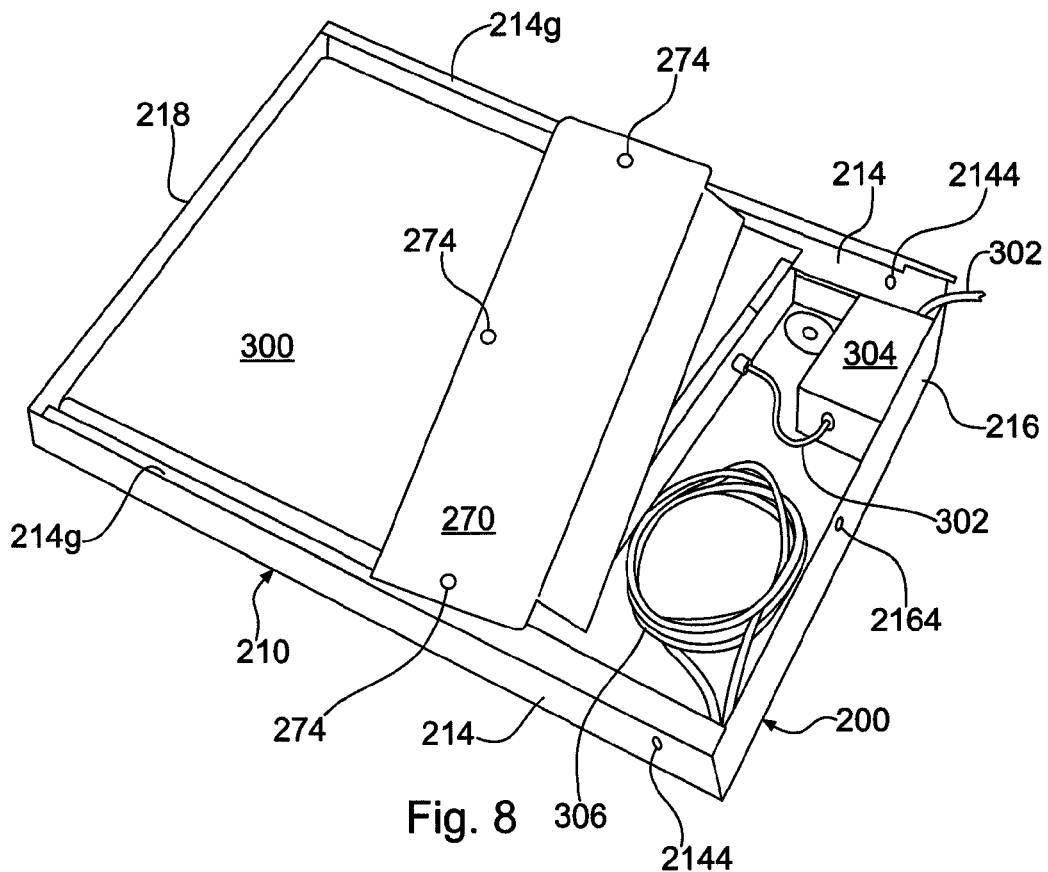
FIG. 8 is an isometric view of an example secured computing device and security container having a storage compartment for electrical cables and wires and various accessories.

FIG. 8 is an isometric view of an example secured computing device including a security container 200 having a storage compartment for electrical cables and wires and various accessories. For example, second cover 270 may enclose a space in which accessories, such as power cords 302, power supplies 304, AC adapters 304, network cables 306, and the like, may be enclosed for shipping and/or storage, and/or such cords, cables and the like may be connected to computer 300 and retained connected thereto by cover 270 and so cannot be disconnected by set up and shut down personnel to whom they are available for use. Covers 230 and 250 may be arranged and operate as described above to provide two or three levels of physical security depending upon the levels of authorization granted to personnel.

Second cover 270 may slide into base 210 of container 200 in similar manner to that described in relation to cover 230 and cover 250, e.g., either under flanges like flanges 214f or in guides like guides 214g. Alternatively, two covers 270 may be mounted on a common hinge 276 (as is suggested by the solid and dashed covers 270 of FIG. 3) and have slightly different shapes so that they do not interfere, but "nest" together when closed. Cover 270 preferably has holes 274 in locations corresponding to holes 2144, 2164 of sides 214 and rear wall 216 so that security devices 290 may be placed through holes 274, 2144, 2164 for removably securing cover 270 to base 210 of container 200. Two different unattached covers 270 may be provided with different shapes for providing different access to the space in which items 302, 304, 306 may be stored and the rear of computer 300 accessed, so that the two different covers 270 when secured with security devices 290 having different access may provide two levels of security and access.

Where a cover 270 is provided, it is noted that cover 270 may provide more than a single level of security for the input/output ports, CD and DVD drives, and the like. In such case, cover 270 may include two or more separately operable covers 270, each of which may be hinged 276 at rear wall 216 or may be attached to base 210 by separate respective security devices 290. Illustrated cover 270 is completely removable, e.g., by removing the security devices 290 that secure it to base 210, and is shown lying on top of container base 210 and computer 300, as it might be when removed for gaining access to the items in base 210 between computer processor 220 and rear wall 216. A first or inner cover 270, when closed, would cover those input/output ports, drives, and connections to which only trusted personnel are permitted access, while leaving exposed predetermined ports, drives and connections that are needed to be available to the personnel that set up and shut down computer 300, such as power cords and connections, write-only drives, and controlled network connections. The second or outer cover 270 would be openable by the personnel that set up and shut down computer 300 and, when closed, would cover and enclose even the predetermined ports, drives and connections that are needed to be available to the personnel that set up and shut down computer 300, such as power cords and connections, write-only drives, and controlled network connections.

The same or different types of security devices 290 may be employed with any particular container 200, and may be of similar or different type and operation, depending upon the security desired. For example, devices 290 may be simple physical loop seals that cannot be opened without being damaged so that tampering/opening of seals 290 is evident, or may be electrically conductive or optically transmissive loops with continuity detection or another sensor, or may be electrical or optical loops with transmitters for transmitting condition messages, or may be locks so that only those with a key (whether mechanical or combination or electronic) may open the locks without leaving evidence of tampering/opening. Further, security devices 290 may be electronic seals that either transmit a message so long as they are not damaged or that transmit a message only after they are damaged, or that transmit different messages before and after they are damaged, or may include RFID devices that either transmit a message so long as they are not damaged or that transmit a message only after they are damaged, or that transmit different messages before and after they are damaged, or that transmit at different power levels, or that transmit at known or predetermined signal strengths.

Thus, the present arrangement 200 may be utilized in conjunction with simple, manual security devices 290 and processes, such as seals and locks, from which information relating to tampering is observable, with semi-manual security devices 290 and processes, such as electronic seals and locks, from which information relating to tampering must be read out, and with automatic security devices 290 and processes, such as RFID and other transmitting devices, from which information relating to tampering is transmitted automatically.

Where transmitting types of security devices 290 are employed, the signals transmitted thereby are received at one or more local receivers and are communicated to one or more computers that monitor and track the security devices 290. Such computer(s) may be associated with the receiver or the received signals may be communicated to the monitoring and tracking computer(s), e.g., via any suitable communication path. Such path may include a radio relay, a WiFi network, an ad hoc network, wiring and/or cabling, a LAN, a WAN, the Internet, or any combination thereof. Mechanical seals, e.g., that provide physical indication or evidence of tampering, may be detected by human inspection, either directly or via video, television, or other observation devices.

Examples of, among other things, RFID devices, systems and methods that may be employed in or with security devices 290 of container 200 are described in Applicant's U.S. Pat. No. 7,319,397 entitled "RFID DEVICE FOR OBJECT MONITORING, LOCATING, AND TRACKING," U.S. Pat. No. 7,342,497 entitled "OBJECT MONITORING, LOCATING, AND TRACKING SYSTEM EMPLOYING RFID DEVICES," and U.S. Pat. No. 7,423,535 entitled "OBJECT MONITORING, LOCATING, AND TRACKING METHOD EMPLOYING RFID DEVICES," each of which is hereby incorporated herein by reference in its entirety. Devices of the sort described in the foregoing patents may be employed as described, e.g., with container 200 as the container described therein, or as part of other security seals, as may be desired for any particular case.

Figure 9:
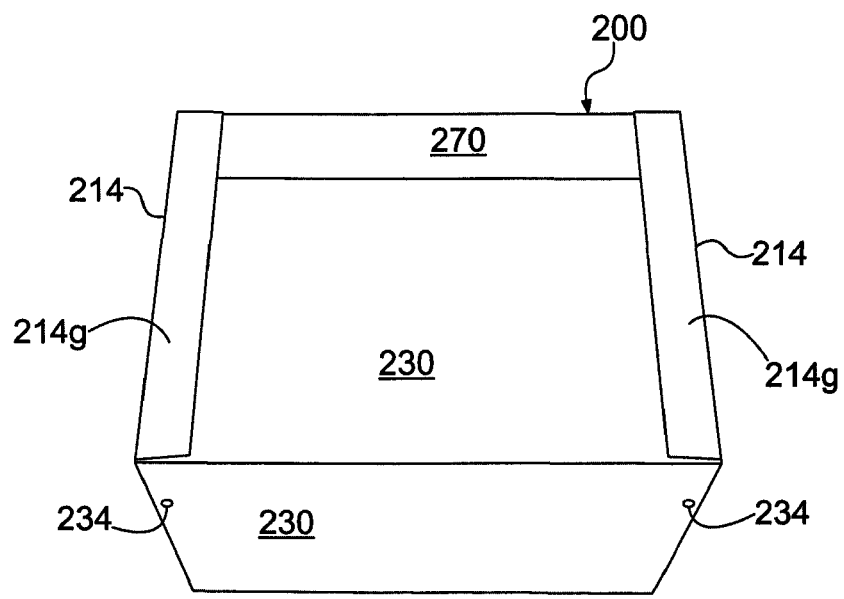
FIG. 9 is a top and front view of a second example embodiment of a secured computing device including a security container for a computing device such as a computer printer or a computer scanner, shown in a closed condition.

FIG. 9 is a top and front view of a second example embodiment of a secured computing device 100 including security container 200 for a computing device 500, such as a computer printer or scanner, shown in a closed condition. Covers 230 and 270 are in place in respective closed positions of container base 210 wherein they are positioned by guides 214g at the tops of the side walls 214 of container base 210, thereby enclosing a computing device, such as a computer printer 500, therein. Covers 230 and 270 may be secured to base 210 by security devices passing through respective holes therein, e.g., holes 234 of cover 230. Computer printer 500 typically has user features, such as a paper supply tray or trays into which blank sheets or other sheets on which printer 500 is to print information are placed, user controls such as an ON/OFF button, access to ink supply containers and/or cartridges, and an output tray into which printer 500 places sheets on which information has been printed. Such user features are available to a user when container 200 and its covers 230, 270 are positioned for use of printer 500.

Figure 10:
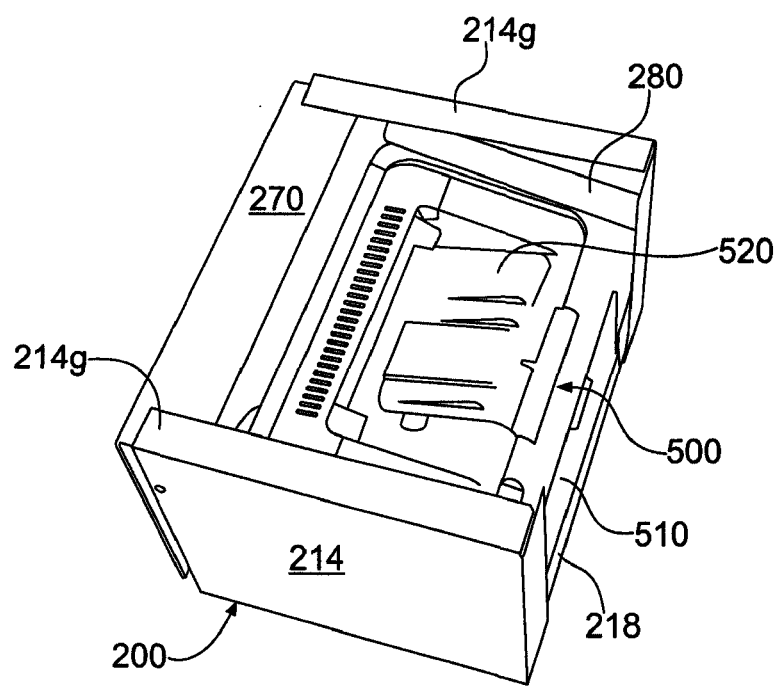
FIG. 10 is a top and side view of the second example embodiment of the secured computing device security container of FIG. 9 shown in an open condition for use and illustrating a computer printer therein.

FIG. 10 is a top and side view of the second example embodiment of a secured computing device including security container 200 for a computing device of FIG. 9 shown in an open condition for use and illustrating a computer printer 500 therein. In the open condition, cover 230 is removed to expose computer printer 500 therein for use. In this example condition, both the paper supply tray 210 and the paper output tray 520 of printer 500 are exposed so that a user may receive from output tray 520 documents printed by printer 500 and may, if and when necessary, replenish a paper supply in the paper supply tray 510. Access may also be provided for clearing the paper path, i.e. the path along which paper is transported through the device 500 from the input 210 to the output 520 thereof.

Cover 270 remains in place to cover the input and/or output ports and connections of printer 500, to which user access is desired to be restricted when printer 500 is in use, but cover 270 is removable, e.g., by authorized service personnel. By employing appropriately different security devices to secure covers 230 and 270, access to printer 500 may be controlled to personnel of appropriate and different security authorization levels.

Security container 200 is of a generally rectangular shape, as would facilitate relatively inexpensive fabrication by cutting and bending sheet metal. Printer 500, however, may not be generally rectangular as is the case for the example printer 500 illustrated. To restrain printer 500 in a desired position within base 210 of container 200, container base 210 includes retention members 280 on side walls 214 of container base 210. In the example illustrated, retention members 280 extend from side walls 214 and slope being closer at their forward ends to the bottom 212 of base 210 than at their rearward ends, thereby to generally follow the forward sloping top surface of printer 500. As a result, printer 500 may be maintained in a desired position in container base 210, and therefore in container 200.

FIG. 11 is a rear view of the second example embodiment of a secured computing device 100 including security container 200 for a computing device 500 of FIGS. 9 and 10 shown in an open condition with the covers 230, 270 and computer printer or scanner 500 removed. Sloped retention members 280 are visible on side walls 214 of container base 210, as are the guides for covers 230, 270 provided by bent flange 214g at the top of wall 214 and a lower guide 214h, thereby to provide two spaced apart parallel members between which cover 230 and cover 270 may be slid into a closed position. Side walls 214 may also have respective bent flanges 215 at the front edges thereof so as to prevent printer 500 from being removed via the front opening of container 200 when cover 230 is removed for use of printer 500.

To further define the position of printer 500 in container base 210, container base 210 may have a cradle member 290 on the bottom 212 thereof. Cradle member 290 has walls 294 extending upward from a base 292 thereof for defining a central location into which printer 500 is to be placed, and tabs 296 extending upward from base 292 for defining the forward limit of printer 500. Cradle member 290 may be attached to container base 210 by rivets, screws, bolts or any other suitable fastener or fastening method. Container base 210 may have an opening 214C through which may pass electrical cables and wires, e.g., USB cables, network cables, power cords and the like, that are connected to printer 500 when cover 270 is removed.

FIG. 12 is a top and side view of a third example embodiment of a secured computing device 100 including security container 200 for a computing device 600, such as a computer printer or scanner, shown in a partially closed condition, i.e. for the purpose of illustration. Both of covers 230 and 270 are shown in a partially open (or partially closed) position to illustrate their respective positions and to reveal the computing device 600, e.g., a computer scanner 600, therein. Container 200 includes side walls 214 having cover guides 214g at the top edges thereof for providing guides into which covers 230 and 270 may be slid. Cover 270 is removable for gaining access to the input and output ports and connections generally located at the rear of scanner 600, and cover 230 is removable for exposing those parts of scanner 600 to which access is needed in order to use scanner 600, including such user features as an input opening or tray into which a document to be scanned may be placed, user controls such as ON/OFF and scan buttons, and optionally an output opening or tray from which the scanned document may be removed. Such user features are available to a user when container 200 and its covers 230, 270 are positioned for use of scanner 600.

Covers 230 and 270, which may be slid into and out of container base 210, may be secured in closed position in container base 210 by security devices passing through holes 230 of cover 230, holes 274 of cover 270, and holes 2144 of container base 210. Cover 270 remains in place to cover the input and/or output ports and connections of scanner 600, to which user access is desired to be restricted when scanner 600 is in use, but cover 270 is removable, e.g., by authorized service personnel. By employing appropriately different security devices to secure covers 230 and 270, access to scanner 600 may be controlled to personnel of appropriate and different security authorization levels.

Figure 13:
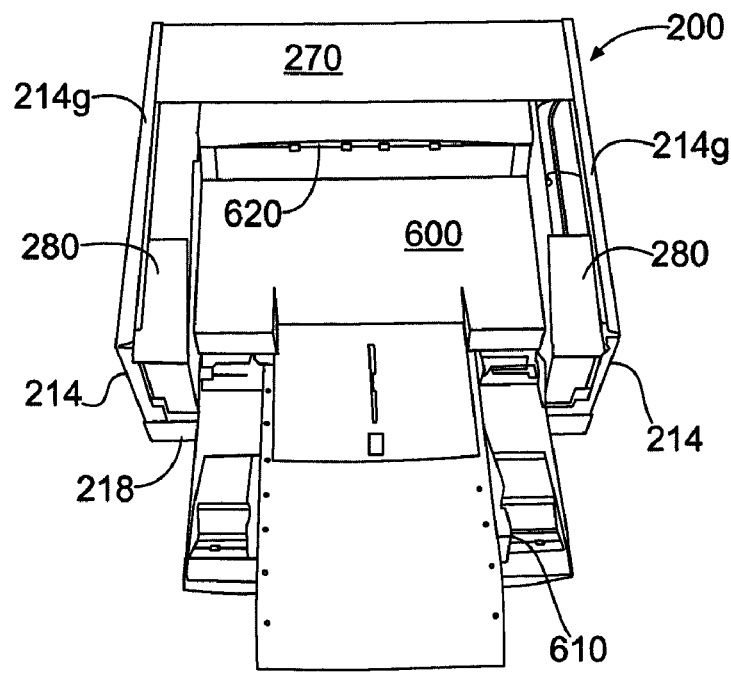
FIG. 13 is a top and front view of the third example embodiment of a secured computing device security container of FIG. 12 shown in an open condition for use and illustrating a computer scanner therein.

FIG. 13 is a top and front view of the third example embodiment of a secured computing device 100 including security container 200 for a computing device 600 of FIG. 12 shown in an open condition for use and illustrating a computer scanner 600 therein. In this condition, cover 230 is removed to expose scanner 600 for use, e.g., allowing a user to access the input tray 610 for placing documents to be scanned therein and to access the output tray for receiving documents that have passed through scanner 600 and have been scanned. Both input tray 610 and output tray 620 fold out from a storage position for use, and both are folded into their respective storage position before cover 270 is slid into its closed position in container base 210. Access may also be provided for clearing the paper path.

Cover 270 remains in place to restrict access to the ports and connections at the rear of scanner 600. Retention members 280 on the side walls 214 of container base 210 help to retain scanner 600 in container base 210 and are shaped so as to generally follow the shape of the top surface of scanner 600.

Figure 14:
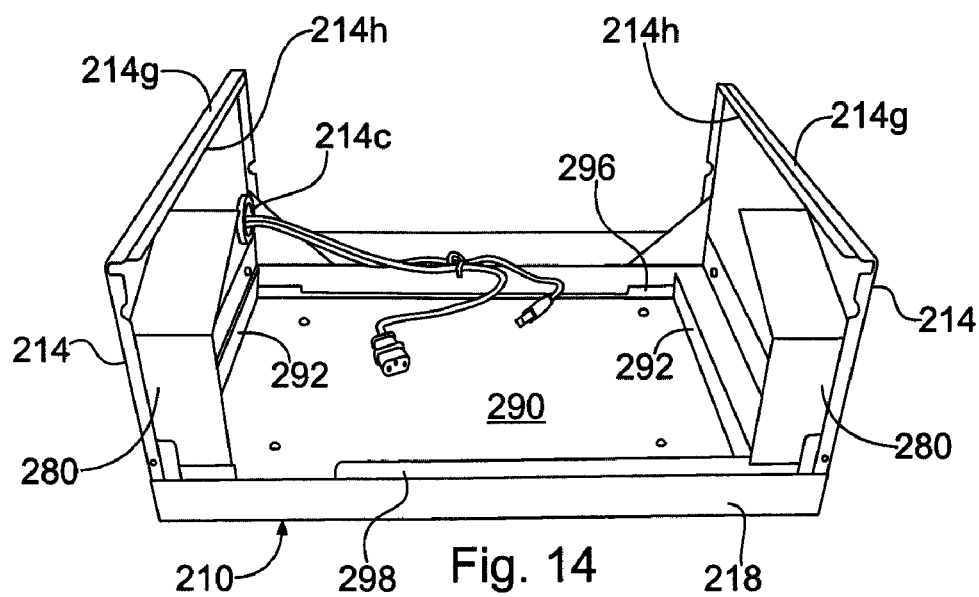
FIG. 14 is a front view of the third example embodiment of the secured computing device security container of FIGS. 12 and 13 shown in an open condition with the computer printer or scanner removed.

FIG. 14 is a front view of the third example embodiment of a secured computing device including security container 200 for a computing device 600 of FIGS. 12 and 13 shown in an open condition with the computer scanner or printer 600 removed. Retention members 280 are visible on side walls 214 of container base 210, as are the guides for covers 230, 270 provided by bent flange 214g at the top of wall 214 and a lower guide 214h, thereby to provide two spaced apart parallel members between which cover 230 and cover 270 may be slid into a closed position. Retention members 280 have sloped flanges that follow the shape of the top of scanner 600 and may also have respective bent flanges at the front edges thereof so as to prevent scanner 600 from being removed via the front opening of container 200 when cover 230 is removed for use of scanner 600.

To further define the position of scanner 600 in container base 210, container base 210 may have a cradle member 290 on the bottom 212 thereof. Cradle member 290 has walls 294 extending upward from a base 292 thereof for defining a central location into which scanner 600 is to be placed, and tabs 296 extending upward from base 292 for defining the rearward limit of scanner 600. Cradle member 290 may be attached to container base 210 by rivets, screws, bolts or any other suitable fastener or fastening method. Container base 210 may have an opening 214C through which may pass electrical cables and wires, e.g., USB cables, network cables, power cords and the like, that are connected to scanner 600 when cover 270 is removed.

A secured computing system 100 may comprise: a computer 300 including a computer processor 320, a computer input device 340 and a computer monitor 360; a base 210 for receiving at least the computer processor 320, the computer input device 340 and the computer monitor 360 therein; a removable and securable first cover 250 cooperating with base 210 for substantially enclosing at least the computer processor 320, computer input device 340 and computer monitor 360 therebetween when first cover 250 is in a first position in base 210; removable and securable first cover 250 cooperating with base 210 for substantially enclosing computer input device 340, first cover 250 having at least one opening 252 through which at least one actuator 342 of the computer input device 340 is accessible when first cover 250 is in a second position in base 210; and a securable second cover 270, 218' cooperating with base 210 for preventing access to predetermined ones of input and output ports and/or devices of the computer processor 320 when second cover 270, 218' is in a secured position with respect to base 210, wherein access to the predetermined ones of input and output ports and/or devices of the computer processor 320 is available when second cover 270, 218' is not in the secured position. Each of first and second covers 250, may be separately securable with respect to base 210. Each of first and second covers 250, 218' may be separately securable with respect to base 210 by a respective locking device 290 that passes through respective openings 254, 274, 2144, 2184 in base 210, first cover 250 and second cover 270, 218', respectively. Computer 300 may have the input device 340 packaged with its processor 320 as a processor unit 320 and may have the monitor 360 movably mounted to the processor unit 320. Base 210 may comprise a generally planar base member 212 having at least three walls 214, 216 extending therefrom for defining a cavity into which the computer processor unit 320 may be placed, having first receiving members 214g for receiving first cover 250 in the first position opposing the base member, and having second receiving members 250g for receiving first cover 250 between the first position and the input device 340 of the computer processor unit 320. Computer monitor 360 may be moved to a position adjacent the computer processor 320 and the first cover 250 may be secured to the base 210 in the first position to enclose the computer monitor 360. Computer input device 340 may be a keyboard 340 and the at least one opening 252 of first cover 250 may be adjacent to one or more keys 342 of the keyboard 340 when first cover 250 is secured to base 210 in the second position. Computer processor 320 may have an input port, an output port, a serial port, a parallel port, a USB port, a modem connector, a network connector, a disk drive, or a combination thereof, along an edge of the computer processor 320, and second cover 270, 218' may be positionable with respect to base 210 for providing access to and for covering the edge of the computer processor 320. The second cover 270, 218' may include a cover member 270 positionable and securable proximate a rear portion of base 210, cover member 270 being positionable and securable with respect to base 210 for providing access to and for covering a rear side of the computer processor 320; or may include a cover member 218' positionable and securable proximate a front portion of base 210 for engaging a front side of the computer processor 320 for preventing removal of the computer processor 320 from base 210, wherein the computer processor 320 may be removable from base 210 when cover member 218' is not secured to base 210. Secured computing system 100 may further comprise one or more security devices 290, wherein first cover 250 and second cover 270, 218' are secured to base 210 by respective ones of one or more security devices 290. One or more security devices 290 may include a seal, a lock, a loop, a mechanical lock, a combination lock, an electronic lock, a security tag, a plastic tie, a mechanical seal, an electronic seal, an electrically conductive loop with continuity detection, an optically transmissive loop with continuity detection, an electrical loop with a transmitter for transmitting a condition message, an optical loop with a transmitter for transmitting a condition message, an electronic seal that transmits a message so long as it is not damaged, an electronic seal that transmits a message only after it is damaged, an electronic seal that transmits different messages before and after it is damaged, an RFID device that transmits a message so long as it is not damaged, an RFID device that transmits a message only after it is damaged, an RFID device that transmits different messages before and after it is damaged, an RFID device that transmits at different power levels, an RFID device that transmits at known defined signal strengths, or a combination thereof.

Security device 290 securing first cover 250 may provide a different level of security for first cover 250 than security device 290 securing second cover 270, 218' provides for second cover 270, 218'. Secured computing system 100 may further comprise a third cover 230 for engaging base 210 in a one of the first and second positions, and: security device 290 securing first cover 250 and security device 290 securing second cover 270, 218' may each provide a different level of security; or security device 290 securing first cover 250 and security device 290 securing third cover 230 may each provide a different level of security; or security device 290 securing second cover 270, 218' and security device 290 securing third cover 230 may each provide a different level of security; or security device 290 securing first cover 250, security device 290 securing second cover 270, 218', and security device 290 securing third cover 230, may each provide a different level of security. Cushioning material may be disposed in base 210 for cushioning computer 300 when computer 300 is disposed in base 210. Computer 300 may be programmed to perform functions responsive to actuation of keys 342 of the computer input device 340 that are different from the functions performed thereby when under control of a standard computer operating system; or computer 300 may be programmed as a voting machine, a voting terminal, a survey device, a testing device, a lottery terminal, a data terminal, a data entry terminal, a data retrieval terminal, a network terminal, a work station, a service terminal, a point of sale terminal, or a data center terminal; or computer 300 may be programmed to perform functions responsive to actuation of keys 342 of the computer input device 340 that are different from the functions performed thereby when under control of a standard computer operating system and to perform the functions of a voting machine, a voting terminal, a survey device, a testing device, a lottery terminal, a data terminal, a data entry terminal, a data retrieval terminal, a network terminal, a work station, a service terminal, a point of sale terminal, or a data center terminal. Computer 300 may be a portable computer; or a commercial-off-the-shelf computer; or a commercial-off-the-shelf portable computer. Computer 300 may be programmed as a voting machine, wherein the computer monitor 360 displays a voting ballot and the computer input device 340 is a computer keyboard 340 having keys 342 for making a voting selection from the voting ballot, wherein removal of first cover 250 from the first position enables the computer monitor 360 to be viewed, and wherein the at least one opening 252 of first cover 250 enables access for enabling actuation of at least one key 342 of the computer keyboard 340 when first cover 250 is in the second position. The at least one key 342 may include a key 342 for moving an indicator to a voting selection, a key 342 for selecting an indicated voting selection, and a key 342 for casting a ballot of selected voting selections.

A secured computing system container 200 may comprise: a base 210 for receiving at least a computer processor 320, a computer input device 340 and a computer monitor 360 therein; a removable and securable first cover 250 cooperating with base 210 for substantially enclosing at least the computer processor 320, computer input device 340 and computer monitor 360 therebetween when first cover 250 is in a first position in base 210; removable and securable first cover 250 cooperating with base 210 for substantially enclosing a computer input device 340, first cover 250 having at least one opening 252 through which at least one actuator 342 of the computer input device 340 is accessible when first cover 250 is in a second position in base 210; and a securable second cover 270, 218' cooperating with base 210 for preventing access to predetermined ones of input and output ports and/or devices of the computer processor 320 when second cover 270, 218' is in a secured position with respect to base 210, wherein access to the predetermined ones of input and output ports and/or devices of the computer processor 320 is available when second cover 270, 218' is not in the secured position. Each of first and second covers 250, may be separately securable with respect to base 210. Each of first and second covers 250, may be separately securable with respect to base 210 by a respective locking device 290 that passes through respective openings 234, 254, 274, 2144, 2184 in base 210, first cover 250 and second cover 270, 218', respectively. Computer 300 may be a computer 300 having an input device 340 packaged with its processor 320 as a processor unit 320 and having a monitor 360 movably mounted to the processor unit 320. Base 210 may comprise a generally planar base member 210 having at least three walls 214, 216 extending therefrom for defining a cavity into which the computer processor unit 320 may be placed, having first receiving members 214g for receiving first cover 250 in the first position opposing the base member 210, and having second receiving members 250g for receiving first cover 250 between the first position and the input device 340 of the computer processor unit 320. Computer monitor 360 may be moved to a position adjacent the computer processor 320 and first cover 250 may be secured to the base 210 in the first position to enclose the computer monitor 360. Computer input device 340 may be a keyboard 340 and the at least one opening 252 of first cover 250 may be adjacent to one or more keys 342 of the keyboard 340 when first cover 250 is secured to base 210 in the second position. Computer processor 320 may have an input port, an output port, a serial port, a parallel port, a USB port, a modem connector, a network connector, a disk drive, or a combination thereof, along an edge of the computer processor 320, and wherein second cover 270, 218' may be positionable with respect to base 210 for providing access to and for covering the edge of the computer processor 320. The second cover 270, 218' may include a cover member 270 positionable and securable proximate a rear portion of base 210, cover member 270 being positionable and securable with respect to base 210 for providing access to and for covering a rear side of the computer processor 320; or may include a cover member 218' positionable and securable proximate a front portion of base 210 for engaging a front side of the computer processor 320 for preventing removal of the computer processor 320 from base 210, wherein the computer processor 320 may be removable from base 210 when cover member 218' is not secured to base 210. Container 200 may further comprise one or more security devices 290, wherein first cover 250 and second cover 270, 218' may be secured to base 210 by respective ones of one or more security devices 290. Security devices 290 may include a seal, a lock, a loop, a mechanical lock, a combination lock, an electronic lock, a security tag, a plastic tie, a mechanical seal, an electronic seal, an electrically conductive loop with continuity detection, an optically transmissive loop with continuity detection, an electrical loop with a transmitter for transmitting a condition message, an optical loop with a transmitter for transmitting a condition message, an electronic seal that transmits a message so long as it is not damaged, an electronic seal that transmits a message only after it is damaged, an electronic seal that transmits different messages before and after it is damaged, an RFID device that transmits a message so long as it is not damaged, an RFID device that transmits a message only after it is damaged, an RFID device that transmits different messages before and after it is damaged, an RFID device that transmits at different power levels, an RFID device that transmits at known defined signal strengths, or a combination thereof. Security device 290 securing first cover 250 may provide a different level of security for first cover 250 than security device 290 securing second cover 270, 218' provides for second cover 270, 218'. Container 200 may further comprise a third cover 230 for engaging base 210 in a one of the first and second positions, and security device 290 securing first cover 250 and security device 290 securing second cover 270, 218' may each provide a different level of security; or security device 290 securing first cover 250 and security device 290 securing third cover 230 may each provide a different level of security; or security device 290 securing second cover 270, 218' and security device 290 securing third cover 230 may each provide a different level of security; or security device 290 securing first cover 250, security device 290 securing second cover 270, 218', and security device 290 securing third cover 230, may each provide a different level of security. Container 200 may further include cushioning material disposed in base 210 for cushioning a computer 300 when the computer 300 is disposed in base 210. A computer 300 in container 200 may be programmed to perform functions responsive to actuation of keys 342 of the computer input device 340 that are different from the functions performed thereby when under control of a standard computer operating system, e.g., a WINDOWS® computer operating system, a MACINTOSH® computer operating system or a Linux computer operating system; or the computer 300 may be programmed as a voting machine, a voting terminal, a survey device, a testing device, a lottery terminal, a data terminal, a data entry terminal, a data retrieval terminal, a network terminal, a work station, a service terminal, a point of sale terminal, or a data center terminal; or the computer 300 may be programmed to perform functions responsive to actuation of keys 342 of the computer input device 340 that are different from the functions performed thereby when under control of a standard computer operating system and to perform the functions of a voting machine, a voting terminal, a survey device, a testing device, a lottery terminal, a data terminal, a data entry terminal, a data retrieval terminal, a network terminal, a work station, a service terminal, a point of sale terminal, or a data center terminal. Computer 300 may be a portable computer 300; or may be a commercial-off-the-shelf computer 300; or may be a commercial-off-the-shelf portable computer 300. Computer 300 disposed in container 200 may be programmed as a voting machine, wherein the computer 300 includes a computer monitor 360 for displaying a voting ballot and a computer keyboard 340 having keys 342 for making a voting selection from the voting ballot, wherein removal of first cover 250 from the first position enables the computer monitor 360 to be viewed, and wherein the at least one opening 252 of first cover 250 enables access for enabling actuation of at least one key 342 of the computer keyboard 340 when first cover 250 is in the second position. The at least one key 342 may include a key 342 for moving an indicator to a voting selection, a key 342 for selecting an indicated voting selection, and a key 342 for casting a ballot of selected voting selections.

A secured computing system 100 may comprise: a computing device 300, 500, 600 having one or more user features and one or more data ports; a base 210 for receiving the computing device 300, 500, 600 having one or more user features and one or more data ports; a removable and securable first cover 250 cooperating with base 210 for substantially enclosing at least part of the computing device 300, 500, 600 and its user features and data ports therebetween when first cover 250 is in a first position in base 210; a securable second cover 270, 218' cooperating with base 210 for preventing access to the one or more data ports of the computing device 300, 500, 600 when second cover 270, 218' is in a secured position and wherein access to the one or more data ports of the computing device 300, 500, 600 is available when second cover 270, 218' is not in the secured position; wherein the computing device 300, 500, 600 is substantially enclosed when first cover 250 is in the first position in base 210 and the second cover 270, 218' is in the closed position; and wherein a predetermined one or ones of the user features of the computing device 300, 500, 600 are accessible when first cover 250 is not in the first position in base 210. A user may access the predetermined ones of the user features when first cover 250 is not in the first position and may not access the user features when first cover 250 is in the first position in base 210. Each of first and second covers 250, may be separately securable with respect to base 210. Each of first and second covers 250, may be separately securable with respect to base 210 by a respective locking device 290 that passes through respective openings 254, 274, 2144, 2184 in base 210, first cover 250 and second cover 270, 218', respectively. Computing device 300, 500, 600 may include: a computer 300 having an input device 340, a processor 320 and a monitor 360; or a computer peripheral device 500, 600; or a computer 300 having an input device 340, a processor 320 and a monitor 360 and a computer peripheral device 500, 600; or a computer 300 having an input device 340 packaged with its processor 320 as a processor unit 320 and having a monitor 360 movably mounted to the processor unit 320; or a computer peripheral device 500, 600 having a serial port, a parallel port, a USB port, a network port, or a combination thereof; or a computer 300 having an input device 340 packaged with its processor 320 as a processor unit 320 and having a monitor 360 movably mounted to the processor unit 320 and a computer peripheral device 500, 600 having a serial port, a parallel port, a USB port, a network port, or a combination thereof. Computer peripheral device 500, 600 may include a printer 500, or a scanner 600, or a document imaging scanner 600, or an external drive, or a memory device, or a combination of the foregoing. Base 210 may comprise a generally planar base member 210 having at least three walls 214, 216 extending therefrom for defining a cavity into which the computer processor unit 320 may be placed, having first receiving members 214g for receiving first cover 250 in the first position opposing the base member 210, and having second receiving members 250g for receiving first cover 250 between the first position and the input device 340 of the computer processor unit 320. Computer monitor 360 may be moved to a position adjacent the computer processor 320 and the first cover 250 may be secured to the base 210 in the first position to enclose the computer monitor 360. A user feature may include a computer input device 340 which may have a keyboard 340 and an opening 252 of first cover 250 may be adjacent to one or more keys 342 of the keyboard 340 when first cover 250 is secured to base 210 in the second position. Computer processor 320 may have an input port, an output port, a serial port, a parallel port, a USB port, a modem connector, a network connector, a disk drive, or a combination thereof, along an edge of the computer processor 320, and wherein second cover 270, 218' may be positioned with respect to base 210 for providing access to and for covering the edge of the computer processor 320. The second cover 270, 218' may include a cover member 270 positionable and securable proximate a rear portion of base 210, cover member 270 being positionable and securable with respect to base 210 for providing access to and for covering a rear side of the computer processor 320; or may include a cover member 218' positionable and securable proximate a front portion of base 210 for engaging a front side of the computer processor 320 for preventing removal of the computer processor 320 from base 210, wherein the computer processor 320 may be removable from base 210 when cover member 218' is not secured to base 210. Computing device 300, 500, 600 may include a computer peripheral 500, 600, and the predetermined one or ones of the user features may include an on/off switch, or a control interface, or a sheet supply, or an access to a sheet path, or a sheet feed, or an input position, or an output position, or a combination thereof. Secured computing system 100 may further comprise one or more security devices 290, wherein first cover 250 and second cover 270, 218' are secured to base 210 by respective ones of one or more security devices 290. Security devices 290 may include a seal, a lock, a loop, a mechanical lock, a combination lock, an electronic lock, a security tag, a plastic tie, a mechanical seal, an electronic seal, an electrically conductive loop with continuity detection, an optically transmissive loop with continuity detection, an electrical loop with a transmitter for transmitting a condition message, an optical loop with a transmitter for transmitting a condition message, an electronic seal that transmits a message so long as it is not damaged, an electronic seal that transmits a message only after it is damaged, an electronic seal that transmits different messages before and after it is damaged, an RFID device that transmits a message so long as it is not damaged, an RFID device that transmits a message only after it is damaged, an RFID device that transmits different messages before and after it is damaged, an RFID device that transmits at different power levels, an RFID device that transmits at known defined signal strengths, or a combination thereof. The security device 290 securing first cover 250 and security device 290 securing second cover 270, 218' may each provide a different level of security for first cover 250 and second cover 270, 218'. Secured computing system 100 may further comprise a third cover 230 for engaging base 210 in a one of the first and second positions, and security device 290 securing first cover 250 and security device 290 securing second cover 270, 218' may each provide a different level of security; or security device 290 securing first cover 250 and security device 290 securing third cover 230 may each provide a different level of security; or security device 290 securing second cover 270, 218' and security device 290 securing third cover 230 may each provide a different level of security; or security device 290 securing first cover 250, security device 290 securing second cover 270, 218', and security device 290 securing third cover 230, may each provide a different level of security. Cushioning material may be disposed in base 210 for cushioning a computing device 300, 500, 600 when the computing device 300, 500, 600 is disposed in base 210. Computing device 300, 500, 600 may be programmed as a voting machine, a voting terminal, a survey device, a testing device, a lottery terminal, a data terminal, a data entry terminal, a data retrieval terminal, a network terminal, a work station, a service terminal, a point of sale terminal, or a data center terminal. Computing device 300, 500, 600 may be a portable computer 300; or may be a commercial off-the-shelf computer 300; or may be a commercial off-the-shelf portable computer 300; or may be a commercial off-the-shelf peripheral device 500, 600. Computing device 300, 500, 600 may include a computer 300 programmed as a voting machine, wherein the computer 300 includes a computer monitor 360 for displaying a voting ballot and a computer keyboard 340 having keys 342 for making a voting selection from the voting ballot, wherein removal of first cover 250 from the first position enables the computer monitor 360 to be viewed, and wherein the at least one opening 252 of first cover 250 enables access for enabling actuation of at least one key 342 of the computer keyboard 340 when first cover 250 is in the second position. The at least one key 342 may include a key 342 for moving an indicator to a voting selection, a key 342 for selecting an indicated voting selection, and a key 342 for casting a ballot of selected voting selections. Computing device 300, 500, 600 may include: a printer 500 that is protected by first and second covers 250, secured by respective security devices 290 for accessibility at a different level for at least one of: access to an output, access to a power input, access to an on/off switch, access to a cabling interface to a computer, access to the paper tray, and access for clearing a paper path; or a document imaging scanner 600 that is protected by first and second covers 250, secured by respective security devices 290 for accessibility at a different level for at least one of: access to an output, access to a power input, access to an on/off switch, access to a control interface, access to a cabling interface to a computer, access to a paper tray, and access for clearing a paper path.

A secured computing system container 200 may comprise: a base 210 having a bottom 212 and a plurality of walls 214, 216, 218 extending from the bottom 212, wherein the base 210 and plurality of walls 214, 216, 218 define a space for receiving at least a computer processor 320, a computer input device 340 and a computer monitor 360 therein, wherein base 210 has a plurality of openings 2144 for receiving a security device 290 therein; a removable and securable first cover 230 cooperating with base 210 by engaging ones of the plurality of walls 214, 216, 218 thereof for substantially enclosing at least the computer processor 320, computer input device 340 and computer monitor 360 therebetween, first cover 230 having at least one opening 234 for cooperating with at least one of the plurality of openings 2144 of base 210 for receiving a security device 290 therethrough; a securable second cover 250 cooperating with base 210 by engaging ones of the plurality of walls 214, 216, 218 thereof for substantially enclosing a computer input device 340, second cover 250 having at least one opening 252 through which at least one actuator 342 of the computer input device 340 is accessible, second cover 250 having at least one opening 254 for cooperating with at least one of the plurality of openings 2144 of base 210 for receiving a security device 290 therethrough; and a securable third cover 270, 218' cooperating with base 210 by engaging at least one of the plurality of walls 214, 216, 218 of base 210 for preventing access to predetermined ones of input and output ports and/or devices of the computer processor 320, third cover 270, 218' having at least one opening 274, 2184 for cooperating with at least one of the plurality of openings 2144 of base 210 for receiving a security device 290 therethrough. The plurality of walls 214, 216, 218 of base 210 may include at least opposing side walls 214, wherein first cover 230 engages the opposing side walls 214, wherein second cover 250 engages the opposing side walls 214, and wherein third cover 270, 218' engages a rear wall 216 or side walls 214 or the bottom 212 of base 210. Opposing side walls 214 of base 210 may include a flange 214g, 214f or a guide 230g, 250g, or both for engaging first and second covers 230, 250. Base 210 may include a front wall 218 for engaging a computer processor 320 and an angle member 220 for engaging the computer processor 320. Base 210 may include a front wall 218 for engaging a computer processor 320 and an angle member 20 for engaging the computer processor 320; or third cover 270, 218' may engage a computer processor 320 and base 210 may include an angle member 220 for engaging the computer processor 320. A computing device 300, 500, 600 disposed in container 200 may include: a computer 300; or a portable computer 300; or a commercial off-the-shelf computer 300; or a commercial off-the-shelf portable computer 300; or a computer peripheral device 500, 600; or a printer 500; or a scanner 600; or a document imaging scanner 600; or a computer 300 and a peripheral device 500, 600.

A secured computing system container 200 may comprise: a base 210 having a bottom 212 and a plurality of walls 214, 216, 218 extending from the bottom 212, wherein the base 210 and plurality of walls 214, 216, 218 define a space for receiving at least a computer processor 320, a computer input device 340 and a computer monitor 360 therein, wherein base 210 has a plurality of openings 2144 for receiving a security device 290 therethrough; a removable and securable first cover 250 for engaging ones of the plurality of walls 214, 216, 218 of base 210 and having at least one opening 254 for cooperating with at least one of the plurality of openings 2144 of base 210 for receiving a security device 290 therethrough when first cover 250 engages the ones of the plurality of walls 214, 216, 218 of base 210, first cover 250 also having at least one opening 252 through which at least one actuator 342 of the computer input device 340 is accessible when first cover 250 engages the ones of the plurality of walls 214, 216, 218 of base 210; and a securable second cover 270, 218' cooperating with base 210 when in a secured position proximate the bottom 212 or at least one of the plurality of walls 214, 216, 218 of base 210 for preventing access to predetermined ones of input and output ports and/or devices of the computer processor 320, second cover 270, 218' having at least one opening 274, 2184 for cooperating with at least one of the plurality of openings 2144 of base 210 for receiving a security device 290 therethrough when second cover 270, 218' is in the secured position. Base 210 may include on ones of the plurality of walls 214, 216, 218 thereof a first flange 214g or guide 230g or both for receiving removable and securable first cover 250 in a first position for substantially enclosing at least the computer processor 320, computer input device 340 and computer monitor 360 therebetween; and base 210 may include on ones of the plurality of walls 214, 216, 218 thereof a second flange 214f or guide 250g or both for receiving removable and securable first cover 250 in a second position for substantially enclosing a computer input device 340 and not a computer monitor 360. The second cover 270, 218', may include: a cover member 270 positionable and securable proximate a rear wall 216 of base 210, cover member 270 being positionable and securable with respect to base 210 for providing access to and for covering a rear side of the computer processor 320; or a cover member 218' positionable and securable proximate a front portion of base 210 for engaging a front side of the computer processor 320 for preventing removal of the computer processor 320 from base 210, wherein the computer processor 320 is removable from base 210 when cover member 218' is not secured to base 210. Container 200 may further include a first security device 290 for engaging at least one of the plurality of openings 2144 of base 210 and the at least one opening 254 of first cover 250 when first cover 250 is in the first or second position, and a second security device 290 for engaging at least one of the plurality of openings 2144 of base 210 and the at least one opening 274, 2184 of second cover 270, 218" when second cover 270, 218" is in the closed position.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

User features and/or data ports as used herein include: an input device, a keyboard, a monitor, a display, a key, an alpha-numeric key, an alphabetical character key, a function key, keys F1 through F12, a CTRL key, an ALT, DEL. FN, and/or ENTER key, an on/off switch, an actuator, an input port, an output port, an input/output port, a connection, a power cord connector, a disk drive, a write-only drive, a network connection, a USB port, a network port, a CD and/or DVD drive, a PCMCIA slot, an electrical power cord socket, a printer port, a serial port, a parallel port, a modem connector, a network connector, a paper supply tray, an input tray, an output tray, a user control, an ON/OFF button, a scan button, a power input, an ink container access, a cartridge access, a paper path access, a control interface, a cabling interface, a sheet supply, a sheet path access, a sheet feed, an input position, an input opening, an output position, or an output opening, or a combination thereof.

While the present invention has been described in terms of the foregoing example embodiments, variations within the scope and spirit of the present invention as defined by the claims following will be apparent to those skilled in the art. For example, the secure computing system may be configured to include a portable computer as illustrated or to include a desk top computer or other form of computer, e.g., disposed in a security container 200. In such case, the shape and size of container 200 is selected to enclose the processor or tower of the desk top computer and its keyboard with cover 250 configured to cover such keyboard other than certain keys to which users are permitted access. The display (monitor) of such desk top computer may be stored in container 200 and covered by cover 230, and may remain in container 200 when in use or may be removed from container 200 when in use, and the interconnecting cable(s) for such display may be captive at the display and held captive in container 200 by cover.

In addition, security container 200 may be configured to also contain one or more peripheral devices, such as a monitor, a printer, a scanner, a writing or signature pad, a mouse device, or other peripheral device, and such peripheral device may be captive to the processor contained therein or may be connectable and disconnectable therefrom. In such instance, container 200 base 210 may be configured to contain such peripheral devices, whether in a single compartment, or in different compartments that may have common covers or separate covers as may be desired in connection with a particular application. Thus, in a voting computer, a printer may be partially accessible to poll workers by removing one cover, e.g., for changing paper and/or clearing paper jams, but not for accessing its interconnections with computer 300 that might be protected by a cover that only election officials may open.

Each of the U.S. Provisional Patent Applications, U.S. patent applications, and/or U.S. patents identified herein are hereby expressly incorporated herein by reference in their entirety.

Finally, numerical values stated are typical or example values, are not limiting values, and do not preclude substantially larger and/or substantially smaller values. Values in any given embodiment may be substantially larger and/or may be substantially smaller than the example or typical values stated. In addition, directions such as top, bottom, forward, rearward, front and back are used to indicate a usual or relative direction, and may not correspond to an actual direction for a particular device when in use, storage and/or transport, or being prepared therefor.

What is claimed is:

1. A secured computing system comprising:
   a computer including a computer processor, a computer input device and a computer monitor;
   a base for receiving at least the computer processor, the computer input device and the computer monitor therein;
   a removable and securable first cover cooperating with said base for substantially enclosing at least the computer processor, the computer input device and the computer monitor therebetween when said first cover is in a first position in said base;
   said removable and securable first cover cooperating with said base for substantially enclosing the computer input device, said first cover having at least one opening through which at least one actuator of the computer input device is accessible when said first cover is in a second position in said base; and
   a securable second cover cooperating with said base for preventing access to predetermined ones of input and output ports and/or devices of the computer processor when said second cover is in a secured position with respect to said base, wherein access to the predetermined ones of input and output ports and/or devices of the computer processor is available when said second cover is not in the secured position.

2. The secured computing system of claim 1 wherein each of said first and second covers is separately securable with respect to said base by a respective locking device that passes through respective openings in said base, said first cover and said second cover, respectively.

3. The secured computing system of claim 1 wherein the computer has the input device packaged with its processor as a processor unit and has the monitor movably mounted to the processor unit.

4. The secured computing system of claim 3 wherein said base comprises a generally planar base member having at least three walls extending therefrom for defining a cavity into which the computer processor unit may be placed, having first receiving members for receiving said first cover in the first position opposing the base member, and having second receiving members for receiving said first cover between the first position and the input device of the computer processor unit.

5. The secured computing system of claim 3 wherein the computer monitor may be moved to a position adjacent the computer processor and wherein the first cover may be secured to the base in the first position to enclose the computer monitor.

6. The secured computing system of claim 1 wherein the computer input device is a keyboard and wherein the at least one opening of said first cover is adjacent to one or more keys of the keyboard when said first cover is secured to said base in the second position.

7. The secured computing system of claim 1 wherein the computer processor has an input port, an output port, a serial port, a parallel port, a USB port, a modem connector, a network connector, a disk drive, or a combination thereof, located along a side of the computer processor, and wherein said second cover includes:
   a cover member positionable and securable proximate a rear portion of said base, said cover member being positionable and securable with respect to said base for providing access to and for covering a rear side of the computer processor; or
   a cover member positionable and securable proximate a front portion of said base for engaging a front side of the computer processor for preventing removal of the computer processor from said base, wherein the computer processor is removable from said base when said cover member is not secured to said base.

8. The secured computing system of claim 1 further comprising one or more security devices, wherein said first cover and said second cover are secured to said base by respective ones of said one or more security devices.

9. The secured computing system of claim 8 wherein said one or more security devices include a seal, a lock, a loop, a mechanical lock, a combination lock, an electronic lock, a security tag, a plastic tie, a mechanical seal, an electronic seal, an electrically conductive loop with continuity detection, an optically transmissive loop with continuity detection, an electrical loop with a transmitter for transmitting a condition message, an optical loop with a transmitter for transmitting a condition message, an electronic seal that transmits a message so long as it is not damaged, an electronic seal that transmits a message only after it is damaged, an electronic seal that transmits different messages before and after it is damaged, an RFID device that transmits a message so long as it is not damaged, an RFID device that transmits a message only after it is damaged, an RFID device that transmits different messages before and after it is damaged, an RFID device that transmits at different power levels, an RFID device that transmits at known defined signal strengths, or a combination thereof.

10. The secured computing system of claim 8 wherein said security device securing said first cover provides a different level of security for said first cover than said security device securing said second cover provides for said second cover.

11. The secured computing system of claim 8 further comprising a third cover for engaging said base in a one of the first and second positions, wherein:
said security device securing said first cover and said security device securing said second cover each provides a different level of security; or
said security device securing said first cover and said security device securing said third cover each provides a different level of security; or
said security device securing said second cover and said security device securing said third cover each provides a different level of security; or
said security device securing said first cover, said security device securing said second cover, and said security device securing said third cover, each provide a different level of security.

12. The secured computing system of claim 1 wherein:
said computer is programmed to perform functions responsive to actuation of keys of the computer input device that are different from the functions performed thereby when under control of a standard computer operating system; or
said computer is programmed as a voting machine, a voting terminal, a survey device, a testing device, a lottery terminal, a data terminal, a data entry terminal, a data retrieval terminal, a network terminal, a work station, a service terminal, a point of sale terminal, or a data center terminal; or
said computer is programmed to perform functions responsive to actuation of keys of the computer input device that are different from the functions performed thereby when under control of a standard computer operating system and to perform the functions of a voting machine, a voting terminal, a survey device, a testing device, a lottery terminal, a data terminal, a data entry terminal, a data retrieval terminal, a network terminal, a work station, a service terminal, a point of sale terminal, or a data center terminal.

13. The secured computing system of claim 1 wherein said computer is programmed as a voting machine, wherein the computer monitor displays a voting ballot and the computer input device is a computer keyboard having keys for making a voting selection from the voting ballot, wherein removal of said first cover from the first position enables the computer monitor to be viewed, and wherein the at least one opening of said first cover enables access for enabling actuation of at least one key of the computer keyboard when said first cover is in the second position.

14. The secured computing system of claim 13 wherein the at least one key includes a key for moving an indicator to a voting selection, a key for selecting an indicated voting selection, and a key for casting a ballot of selected voting selections.

15. A secured computing system container comprising:
a base for receiving at least a computer processor, a computer input device and a computer monitor therein;
a removable and securable first cover cooperating with said base for substantially enclosing at least the computer processor, the computer input device and the computer monitor therebetween when said first cover is in a first position in said base;
said removable and securable first cover cooperating with said base for substantially enclosing a computer input device, said first cover having at least one opening through which at least one actuator of the computer input device is accessible when said first cover is in a second position in said base; and
a securable second cover cooperating with said base for preventing access to predetermined ones of input and output ports and/or devices of the computer processor when said second cover is in a secured position with respect to said base, wherein access to the predetermined ones of input and output ports and/or devices of the computer processor is available when said second cover is not in the secured position.

16. The secured computing system container of claim 15 wherein each of said first and second covers is separately securable with respect to said base by a respective locking device that passes through respective openings in said base, said first cover and said second cover, respectively.

17. The secured computing system container of claim 15 wherein the computer is a computer having an input device packaged with its processor as a processor unit and having a monitor movably mounted to the processor unit.

18. The secured computing system container of claim 17 wherein said base comprises a generally planar base member having at least three walls extending therefrom for defining a cavity into which the computer processor unit may be placed, having first receiving members for receiving said first cover in the first position opposing the base member, and having second receiving members for receiving said first cover between the first position and the input device of the computer processor unit.

19. The security container for securing a computer of claim 17 wherein the computer monitor may be moved to a position adjacent the computer processor and wherein the first cover may be secured to the base in the first position to enclose the computer monitor.

20. The secured computing system container of claim 15 wherein the computer input device is a keyboard and wherein the at least one opening of said first cover is adjacent to one or more keys of the keyboard when said first cover is secured to said base in the second position.

21. The secured computing system container of claim 15 wherein the computer processor has an input port, an output port, a serial port, a parallel port, a USB port, a modem connector, a network connector, a disk drive, or a combination thereof, along an edge of the computer processor, and wherein said second cover includes:
   a cover member positionable and securable proximate a rear portion of said base, said cover member being positionable and securable with respect to said base for providing access to and for covering a rear side of the computer processor; or
   a cover member positionable and securable proximate a front portion of said base for engaging a front side of the computer processor for preventing removal of the computer processor from said base, wherein the computer processor is removable from said base when said cover member is not secured to said base.

22. The secured computing system container of claim 15 further including cushioning material disposed in said base for cushioning a computer when the computer is disposed in said base.

23. A secured computing system comprising:
   a computing device having one or more user features and one or more data ports;
   a base for receiving the computing device having one or more user features and one or more data ports;
   a removable and securable first cover cooperating with said base for substantially enclosing at least part of the computing device and its user features and data ports therebetween when said first cover is in a first position in said base;
   a securable second cover cooperating with said base for preventing access to the one or more data ports of the computing device when said second cover is in a secured position with respect to said base, wherein access to the one or more data ports of the computing device is available when said second cover is not in the secured position;
   wherein the computing device is substantially enclosed when said first cover is in the first position in said base and the second cover is in the secured position; and
   wherein a predetermined one or ones of the user features of the computing device are accessible when said first cover is not in the first position in said base,
   whereby a user may access the predetermined ones of the user features when said first cover is not in the first position and may not access the user features when said first cover is in the first position in said base.

24. The secured computing system of claim 23 wherein each of said first and second covers is separately securable with respect to said base by a respective locking device that passes through respective openings in said base, said first cover and said second cover, respectively.

25. The secured computing system of claim 23 wherein the computing device includes:
   a computer having an input device, a processor and a monitor; or
   a computer peripheral device; or
   a computer having an input device, a processor and a monitor and a computer peripheral device; or
   a computer having an input device packaged with its processor as a processor unit and having a monitor movably mounted to the processor unit; or
   a computer peripheral device having a serial port, a parallel port, a USB port, a network port, or a combination thereof; or
   a computer having an input device packaged with its processor as a processor unit and having a monitor movably mounted to the processor unit and a computer peripheral device having a serial port, a parallel port, a USB port, a network port, or a combination thereof.

26. The secured computing system of claim 25 wherein the computer peripheral device includes a printer, or a scanner, or a document imaging scanner, or an external drive, or a memory device, or a combination of the foregoing.

27. The secured computing system of claim 25 wherein said base comprises a generally planar base member having at least three walls extending therefrom for defining a cavity into which the computer processor unit may be placed, having first receiving members for receiving said first cover in the first position opposing the base member, and having second receiving members for receiving said first cover between the first position and the input device of the computer processor unit.

28. The secured computing system of claim 25 wherein the computer monitor may be moved to a position adjacent the computer processor and wherein the first cover may be secured to the base in the first position to enclose the computer monitor.

29. The secured computing system of claim 23 wherein the one or more user features includes a computer input device having a keyboard and wherein an opening of said first cover is adjacent to one or more keys of the keyboard when said first cover is secured to said base in the second position.

30. The secured computing system of claim 23 wherein the computing device includes a computer processor having an input port, an output port, a serial port, a parallel port, a USB port, a modem connector, a network connector, a disk drive, or a combination thereof, along a side of the computer processor, and wherein said second cover includes:
   a cover member positionable and securable proximate a rear portion of said base, said cover member being positionable and securable with respect to said base for providing access to and for covering a rear side of the computer processor; or
   a cover member positionable and securable proximate a front portion of said base for engaging a front side of the computer processor for preventing removal of the computer processor unit from said base, wherein the computer processor is removable from said base when said cover member is not secured to said base.

31. The secured computing system of claim 23 wherein the computing device includes a computer peripheral, and wherein the predetermined one or ones of the user features include an on/off switch, or a control interface, or a sheet supply, or an access to a sheet path, or a sheet feed, or an input position, or an output position, or a combination thereof.

32. The secured computing system of claim 23 further comprising one or more security devices, wherein said first cover and said second cover are secured to said base by respective ones of said one or more security devices.

33. The secured computing system of claim 32 wherein said one or more security devices include a seal, a lock, a loop, a mechanical lock, a combination lock, an electronic lock, a security tag, a plastic tie, a mechanical seal, an electronic seal, an electrically conductive loop with continuity detection, an optically transmissive loop with continuity detection, an electrical loop with a transmitter for transmitting a condition message, an optical loop with a transmitter for transmitting a condition message, an electronic seal that transmits a message so long as it is not damaged, an electronic seal that transmits a message only after it is damaged, an electronic seal that transmits different messages before and after it is damaged, an RFID device that transmits a message so long as it is not damaged, an RFID device that transmits a message only after it is damaged, an RFID device that transmits different messages before and after it is damaged, an RFID device that transmits at different power levels, an RFID device that transmits at known defined signal strengths, or a combination thereof.

34. The secured computing system of claim 32 wherein said security device securing said first cover and said security device securing said second cover each provides a different level of security for said first cover and said second cover.

35. The secured computing system of claim 32 further comprising a third cover for engaging said base in a one of the first and second positions, wherein:
   said security device securing said first cover and said security device securing said second cover each provides a different level of security; or
   said security device securing said first cover and said security device securing said third cover each provides a different level of security; or
   said security device securing said second cover and said security device securing said third cover each provides a different level of security; or
   said security device securing said first cover, said security device securing said second cover, and said security device securing said third cover, each provide a different level of security.

36. The secured computing system of claim 23 wherein said computing device is programmed as a voting machine, a voting terminal, a survey device, a testing device, a lottery terminal, a data terminal, a data entry terminal, a data retrieval terminal, a network terminal, a work station, a service terminal, a point of sale terminal, or a data center terminal.

37. The secured computing system of claim 23 wherein said computing device includes a computer programmed as a voting machine, wherein the computer includes a computer monitor for displaying a voting ballot and a computer keyboard having keys for making a voting selection from the voting ballot, wherein removal of said first cover from the first position enables the computer monitor to be viewed, and wherein the at least one opening of said first cover enables access for enabling actuation of at least one key of the computer keyboard when said first cover is in the second position.

38. The secured computing system of claim 37 wherein the at least one key includes a key for moving an indicator to a voting selection, a key for selecting an indicated voting selection, and a key for casting a ballot of selected voting selections.

39. The secured computing system of claim 23 wherein said computing device includes:
   a printer that is protected by said first and second covers secured by respective security devices for accessibility at a different level for at least one of: access to an output, access to a power input, access to an on/off switch, access to a cabling interface to a computer, access to the paper tray, and access for clearing a paper path; or
   a document imaging scanner that is protected by said first and second covers secured by respective security devices for accessibility at a different level for at least one of: access to an output, access to a power input, access to an on/off switch, access to a control interface, access to a cabling interface to a computer, access to a paper tray, and access for clearing a paper path.

40. The secured computing system of claim 23 wherein the user features and data ports include: an input device, a keyboard, a monitor, a display, a key, an alpha-numeric key, an alphabetical character key, a function key, keys F1 through F12, a CTRL key, an ALT, DEL. FN, and/or ENTER key, an on/off switch, an actuator, an input port, an output port, an input/output port, a connection, a power cord connector, a disk drive, a write-only drive, a network connection, a USB port, a network port, a CD and/or DVD drive, a PCMCIA slot, an electrical power cord socket, a printer port, a serial port, a parallel port, a modem connector, a network connector, a paper supply tray, an input tray, an output tray, a user control, an ON/OFF button, a scan button, a power input, an ink container access, a cartridge access, a paper path access, a control interface, a cabling interface, a sheet supply, a sheet path access, a sheet feed, an input position, an input opening, an output position, or an output opening, or a combination thereof.

* * * * *